US010610846B2

United States Patent
Chakravarty et al.

(10) Patent No.: US 10,610,846 B2
(45) Date of Patent: *Apr. 7, 2020

(54) TWO-DIMENSIONAL PHOTONIC CRYSTAL MICROARRAY MEASUREMENT METHOD AND APPARATUS FOR HIGHLY-SENSITIVE LABEL-FREE MULTIPLE ANALYTE SENSING, BIOSENSING, AND DIAGNOSTIC ASSAY

(71) Applicants: Swapnajit Chakravarty, Austin, TX (US); Yunbo Guo, Austin, TX (US); Ray T. Chen, Austin, TX (US)

(72) Inventors: Swapnajit Chakravarty, Austin, TX (US); Yunbo Guo, Austin, TX (US); Ray T. Chen, Austin, TX (US)

(73) Assignee: Omega Optics, Inc., Austin, TX (US)

( * ) Notice: Subject to any disclaimer, the term of this patent is extended or adjusted under 35 U.S.C. 154(b) by 1417 days.

This patent is subject to a terminal disclaimer.

(21) Appl. No.: 14/308,671

(22) Filed: Jun. 18, 2014

(65) Prior Publication Data
US 2014/0378328 A1   Dec. 25, 2014

Related U.S. Application Data

(60) Provisional application No. 61/836,995, filed on Jun. 19, 2013.

(51) Int. Cl.
*G01N 21/00* (2006.01)
*B01J 19/00* (2006.01)
*G01N 21/77* (2006.01)

(52) U.S. Cl.
CPC ...... *B01J 19/0046* (2013.01); *G01N 21/7743* (2013.01)

(58) Field of Classification Search
CPC .................. G01N 33/54373; H01S 3/06741
USPC ......................................... 422/82.11; 385/12
See application file for complete search history.

(56) References Cited

U.S. PATENT DOCUMENTS

2008/0225293 A1* 9/2008 Ye ..................... G01N 21/6408
356/364

* cited by examiner

*Primary Examiner* — Natalia Levkovich
(74) *Attorney, Agent, or Firm* — Taboada Law Firm, PLLC; John M. Taboada

(57) ABSTRACT

Methods and systems for highly-sensitive label-free multiple analyte sensing, biosensing, and diagnostic assay are disclosed. The systems comprise an on-chip integrated two-dimensional photonic crystal sensor chip. The invention provides modulation methods, wavelength modulation and intensity modulation, to monitor the resonance mode shift of the photonic crystal microarray device and further provides methods and systems that enable detection and identification of multiple species to be performed simultaneously with one two-dimensional photonic crystal sensor chip device for high throughput chemical sensing, biosensing, and medical diagnostics. Other embodiments are described and claimed.

18 Claims, 29 Drawing Sheets

TWO-DIMENSIONAL PHOTONIC CRYSTAL MICROARRAY MEASUREMENT METHOD AND APPARATUS FOR HIGHLY-SENSITIVE LABEL-FREE MULTIPLE ANALYTE SENSING, BIOSENSING, AND DIAGNOSTIC ASSAY

I. CROSS REFERENCE TO RELATED APPLICATIONS

This application claims the benefit of the filing date of U.S. Provisional Patent Application Ser. No. 61/836,995, filed on Jun. 19, 2013, entitled "Two-Dimensional Photonic Crystal MicroArray Measurement Method and Apparatus for Highly-Sensitive Label-Free Multiple Analyte Sensing, Biosensing, and Diagnostic Assay," the entire disclosure of which is hereby incorporated by reference into the present disclosure.

II. BACKGROUND

Field of the Invention

This invention relates generally to the field of optical and medical devices, and more specifically to an apparatus and method for microarray implementation for the detection of multiple analytes such as chemical agents and biological molecules using photonic crystals.

Background of the Invention

Label-free optical sensors based on photonic crystals have been demonstrated as a highly sensitive potential method for performing a large range of biochemical and cell-based assays. Tight confinement of the optical field in photonic crystal microcavities leads to a strong interaction with the surrounding ambient in the vicinity of the microcavity, thereby leading to high sensitivity to changes in the refractive index of the ambient. Much of the research in photonic crystal devices has relied on enhancing refractive index sensitivity to a single analyte (Lee M. R., Fauchet M., "Nanoscale microcavity sensor for single particle detection," Optics Letters 32, 3284 (2007)). Research on photonic crystals for multiple analyte sensing has focused on one-dimensional photonic crystal grating-like structures, such as disclosed in Ye et al. in U.S. Patent Application 20080225293 and in Cunningham et al. in U.S. Patent Application 20030027328, that measure the resonant peak reflected wavelengths. Such sensors have resonant peaks with wide linewidths due to the one-dimensional confinement and do not utilize the full potential of narrow resonant linewidths of two-dimensional photonic crystal microcavities. Furthermore, measurements are made from each sensor element in the array in a serial process, requiring multiple sources and detectors for parallel sensing beyond a single element. One dimensional photonic crystal microcavities, in addition to poor optical confinement, do not utilize the slow light effect due to reduced group velocity in two-dimensional photonic crystal waveguides that would otherwise enhance coupling efficiency and thereby improve signal-to-noise ratio of sensing. Demonstrated two dimensional photonic crystal waveguide biosensors rely on shifts of the stop-gap (see Skivesen N. et al., "Photonic crystal waveguide biosensor," Optics Express 15, 3169 (2007)) or shifts of the resonant peak of an isolated microcavity (see Chakravarty S. et al., "Ion detection with photonic crystal microcavities," Optics Letters 30, 2578 (2005)). In either case, the design is not suitable for the fabrication of microarrays for multiple analyte sensing.

Two dimensional photonic crystal microcavities integrated with two-dimensional photonic crystal waveguides offer the possibility of integrating the high quality-factor resonances of two-dimensional photonic crystal microcavities with the slow light effect of two-dimensional photonic crystal waveguides for high sensitivity, high signal-to-noise ratio sensing. Furthermore, multiple photonic crystal microcavities can be simultaneously arrayed along a single photonic crystal waveguide, so that a single measurement can be performed in parallel to elicit the response from multiple sensor elements, thereby increasing measurement throughput and reducing cost. An array of two sensors demonstrated using two-dimensional photonic crystal microcavities uses multiple ridge waveguides between individual photonic crystal microcavities. Coupling between photonic crystal waveguides and ridge waveguides introduces additional significant transmission loss at each interface, thereby significantly reducing signal-to-noise ratio as each microcavity is added for multiple sensing. The design demonstrated by Guillermain et al. (see Guillermain E., Fauchet P. M., "Multi-channel sensing with resonant microcavities coupled to a photonic crystal waveguide," JWA 45, CLEO Conference (2009)) in effect employs multiple photonic crystal waveguides and also employs microcavities with significantly poor quality factors that make the designs unsuitable for high sensitivity sensing.

A standard on-chip multiple protein patterning technique using lithography typically requires a pre-bake resist temperature of 100° C. or higher. At the very least, temperatures this high compromise or alter biological functionality, and at the very worst they may destroy its function. Most proteins are stable in vivo at a temperature of 37° C., but this stability is dependent on chaperone proteins that maintain the proper conformation of other proteins in cells. Since proteins in vitro lack these chaperone proteins, they must be maintained at even lower temperatures to prevent denaturation and loss of function. Designs are needed to enable patterning of different kinds of target binding molecules in aqueous phase to preserve the functionality of the molecules.

Designs are needed in the art to integrate two-dimensional photonic crystal microcavities with two-dimensional photonic crystal waveguides for multiple analyte sensing and designs are further needed to pattern multiple target binding molecules, of different constitutions on the photonic crystal substrate while preserving their functionality.

Additionally, modulation methods are needed in the art to monitor the resonance mode shift of the two-dimensional photonic crystal microcavities and then to retrieve the information of biomolecular interactions. Suitable modulation methods are further needed to achieve multiplexing biomolecular detections with suitable system configurations.

III. SUMMARY

One embodiment of the invention provides a sensor comprising a top semiconductor material slab with high dielectric constant, supported on the bottom by a low dielectric constant cladding. The low dielectric constant cladding is supported on the bottom by a substrate. A triangular lattice of photonic crystal holes is etched into the slab with high dielectric constant. The photonic crystal waveguide is defined by filling a single row of holes, from input ridge waveguide transition to output ridge waveguide transition with the semiconductor slab material. The path of guided light in the semiconductor slab of high dielectric constant from via the input ridge waveguide, through the photonic crystal waveguide and ending with the output ridge waveguide defines the core in the slab. A photonic crystal microcavity is similarly defined by filing a few holes with semiconductor slab material. Multiple photonic crystal microcavities are patterned at a distance of x lattice constants from the photonic crystal waveguide where x=1, 2, 3, 4, 5, 6, 7, and/or 8. The distance between individual photonic crystal microcavities is y lattice periods, where y=10 to infinity. The high dielectric constant slab with structured photonic crystal waveguide and photonic crystal microcavities, together with the low dielectric constant cladding, form the photonic crystal microarray structure. Light is coupled into the photonic crystal waveguide from an input ridge waveguide. Light is out-coupled from the photonic crystal waveguide to an output ridge waveguide. In one instance, the input light source is a broadband optical emission source such as an amplified spontaneous emission source. In this instance, the output transmission spectrum is measured with a spectrometer such as an optical spectrum analyzer. In one instance, the input light source can be a tunable laser where the optical output of the tunable laser can be tuned versus wavelength. In this instance, the output transmission spectrum is measured by a photodetector. When a broadband wavelength light source is input to the photonic crystal waveguide, wavelengths corresponding to the resonant wavelengths of the individual microcavities are coupled to the corresponding microcavities. As a result, minima are observed in the transmission spectrum corresponding to the dropped wavelength of each photonic crystal microcavity. Depending upon the wavelength range of interrogation, the lattice period of the photonic crystal lattice, $\alpha$, can vary from 50 nm to 1500 nm and the depth of the slab can vary from 0.4 to 0.7 times the lattice periodicity above. The slab material can be silicon (or any Group IV material), gallium arsenide (or any III-V semiconductor), or any semiconductor material with high refractive index. The bottom cladding must have a refractive index lower than the refractive index of the slab. For instance, the slab can be silicon and the bottom cladding can be silicon dioxide or silicon nitride. In the case of a freely supported slab, the bottom cladding is then air. In another instance, the slab can also be silicon nitride with a bottom cladding of silicon dioxide. The bottom cladding can be air again for a freely supported silicon nitride membrane. In yet another instance, the slab can be silicon dioxide or any polymer freely supported as a membrane so that the bottom cladding is air. The substrate can be any Group IV material corresponding to the Group IV core material in the periodic table, or any substrate suitable to grow the III-V core material. Above the microcavities, a thin film of target binding molecules is immobilized on the top surface of the microcavities. Each microcavity surface may be coated with an exclusive target binding molecule, such as a biomolecule, that forms a dielectric coating on the slab. The one or more target binding molecules are free of detection labels, in other words, label-free. The one or more specific target binding molecules are thus arranged in an array on the microcavities, along the photonic crystal waveguide. The slab is immersed in an ambient medium which can be water, phosphate buffered saline, or any medium (liquid, solid, or gas) in which the target binding molecules are not denatured and do not lose their activity. The coating of target binding molecules on the slab together with the ambient medium above the slab effectively form a superstrate or top cladding. The superstrate or top cladding must have lower refractive index than the slab. In instances, where the holes are not filled with any material, the surfaces of the holes in the vicinity of the photonic crystal optical microcavity are also coated with the unique coating of target binding molecules corresponding to each unique photonic crystal optical microcavity. When the holes are not filled with any material, the ambient medium also fills all the holes in the photonic crystal lattice minus the holes that were filled with the target binding molecules. A single transmission spectrum therefore probes the binding events on multiple microcavities. A binding event on a specific micro cavity shifts the corresponding transmission minimum and leads to a sensing event for the specific microcavity. Analyzed biomolecules can be proteins, DNA, RNA, small molecules, or genes. Arrays of microcavities therefore lead to a multiple analyte sensing device that increases the measurement throughput of the device, in addition to the obvious sensitivity enhancements achieved by using a two-dimensional photonic crystal waveguide coupled to two-dimensional photonic crystal microcavities.

The second embodiment of the invention provides methods to monitor the resonance mode shift of the transmission spectrum of the two-dimensional photonic crystal sensor. In some cases, a wavelength modulation method is adopted. When a broadband light source is utilized and input to the photonic crystal sensor, a spectrometer such as an optical spectrum analyzer is used to detect the transmission spectrum; when a tunable laser source is utilized and input to the photonic crystal sensor, a photodetector is used to detect the transmission spectrum. In some other cases, an intensity modulation method is adopted, where a single wavelength laser source and a photodetector are utilized instead. The invention further provides methods to monitor multiple resonance mode shifts of a photonic crystal biosensor due to multiple molecular binding events.

These integrated systems of two-dimensional photonic crystal sensors, with different modulation methods, provide for multiple analyte sensing, biosensing, and diagnostic assay.

To summarize:

The primary objective of the invention is to provide an integrated photonic crystal microarray with compact size that can be monolithically integrated with different kinds of molecules such as proteins, nucleic acids, DNA, RNA, or small molecules to implement a personalized diagnostic chip.

The second objective of the invention is to eliminate the need for labeling of target binding molecules and target binding molecule conjugates for on-chip detection and thereby reduce microarray costs associated with target binding molecule labeling.

The third objective of the invention is to significantly increase measurement throughput from devices by signal collection and analysis from multiple elements of a microarray in a single measurement as opposed to individual element measurements in contemporary systems.

The fourth objective of the invention is to implement novel target binding molecule patterning schemes on a CMOS chip that avoids high temperature processes associated with photolithography and chemical etching for the patterning of multiple target binding molecules and thereby preserves target binding molecule functionality in aqueous phase at room temperatures or even colder if necessary.

The fifth objective of the invention is to develop effective modulation methods to monitor the resonant mode shift of the photonic crystal sensor, and to further develop effective methods to monitor multiple resonance mode shifts for multiplexed analyte detection.

The sixth objective of the invention is to develop novel systems to implement the effective methods with the photonic crystal sensor and to achieve multiplexed analyte detection.

Other objectives and advantages of the present invention will become apparent from the following descriptions, taken in connection with the accompanying drawings, wherein, by way of illustration and example, an embodiment of the present invention is disclosed.

IV. BRIEF DESCRIPTION OF THE DRAWINGS

The drawings constitute a part of this specification and include exemplary embodiments of the present invention, which may be embodied in various forms. It is to be understood that in some instances various aspects of the present invention may be shown exaggerated or enlarged to facilitate an understanding of the invention.

A more complete and thorough understanding of the present invention and benefits thereof may be acquired by referring to the following description together with the accompanying drawings, in which like reference numbers indicate like features, and wherein:

FIG. 1A is a top view of one embodiment of a photonic crystal microarray device based on an array of N photonic crystal microcavities coupled to a photonic crystal waveguide. In FIG. 1A, N is chosen arbitrarily as 4 for space constraints. FIG. 1B is an enlarged section of FIG. 1A.

Figure 7A:
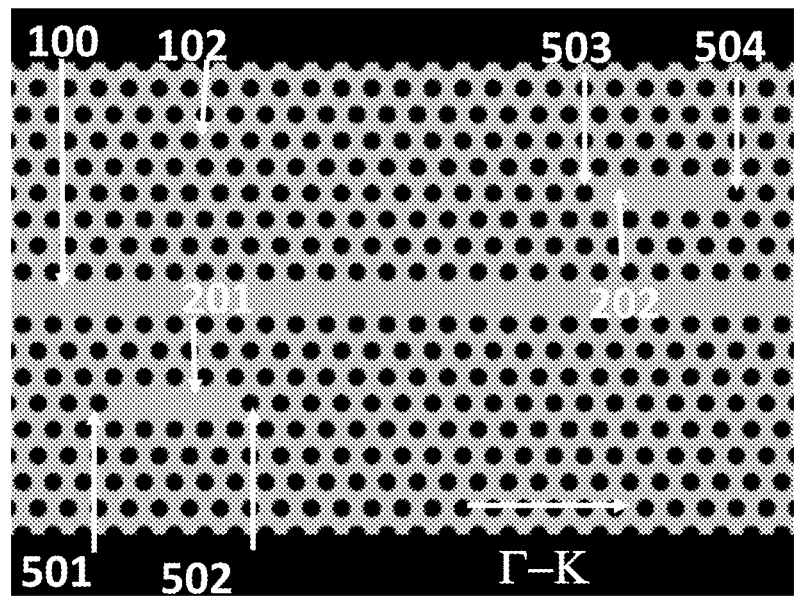
Figure 7B:
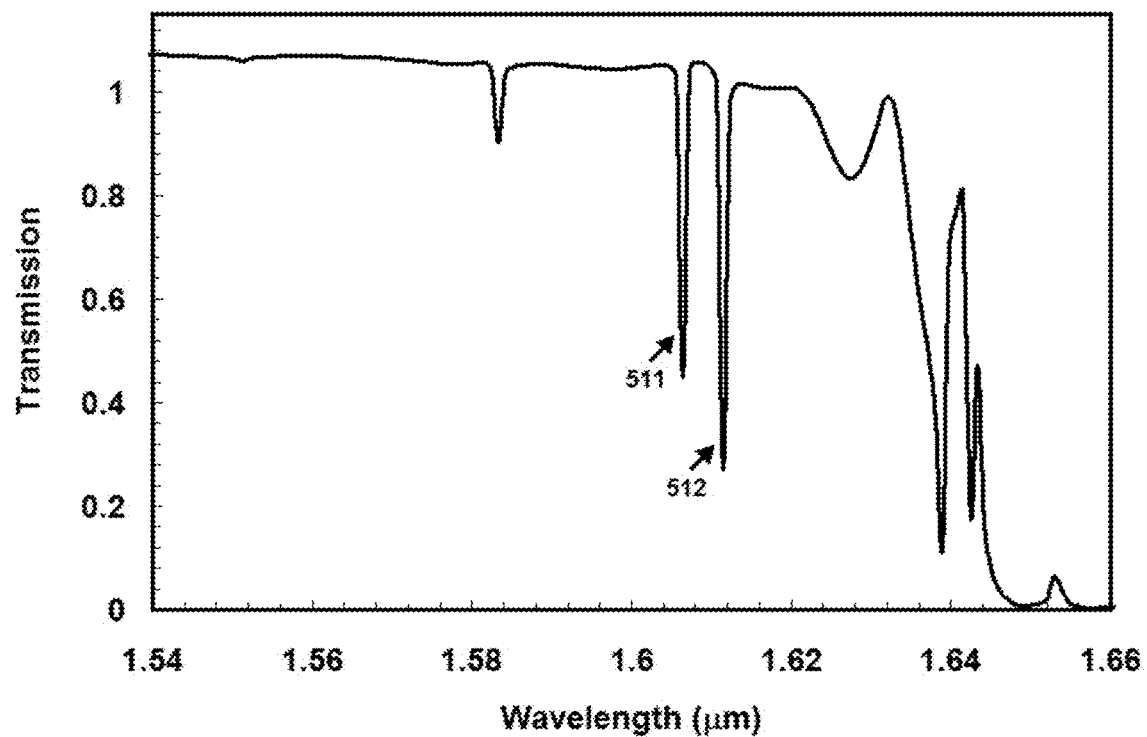

FIG. 7A shows a top view of a functional photonic crystal waveguide with two representatively coupled photonic crystal microcavities along the length of the photonic crystal waveguide. Two (2) microcavities are chosen, as a representative number for n. n can vary from 1 to N (N→∞). FIG. 7B shows the transmission spectrum of the embodiment depicted in FIG. 7A.

Figure 8A:
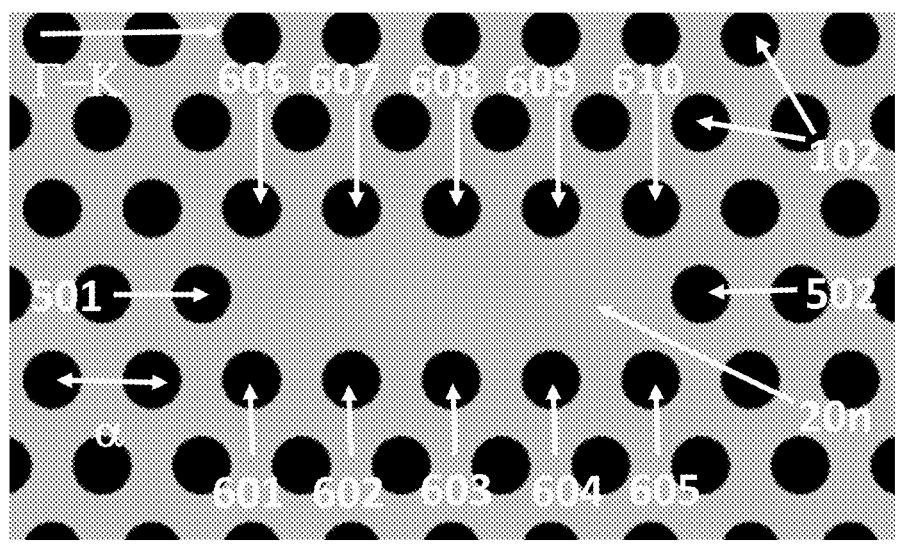
Figure 8B:
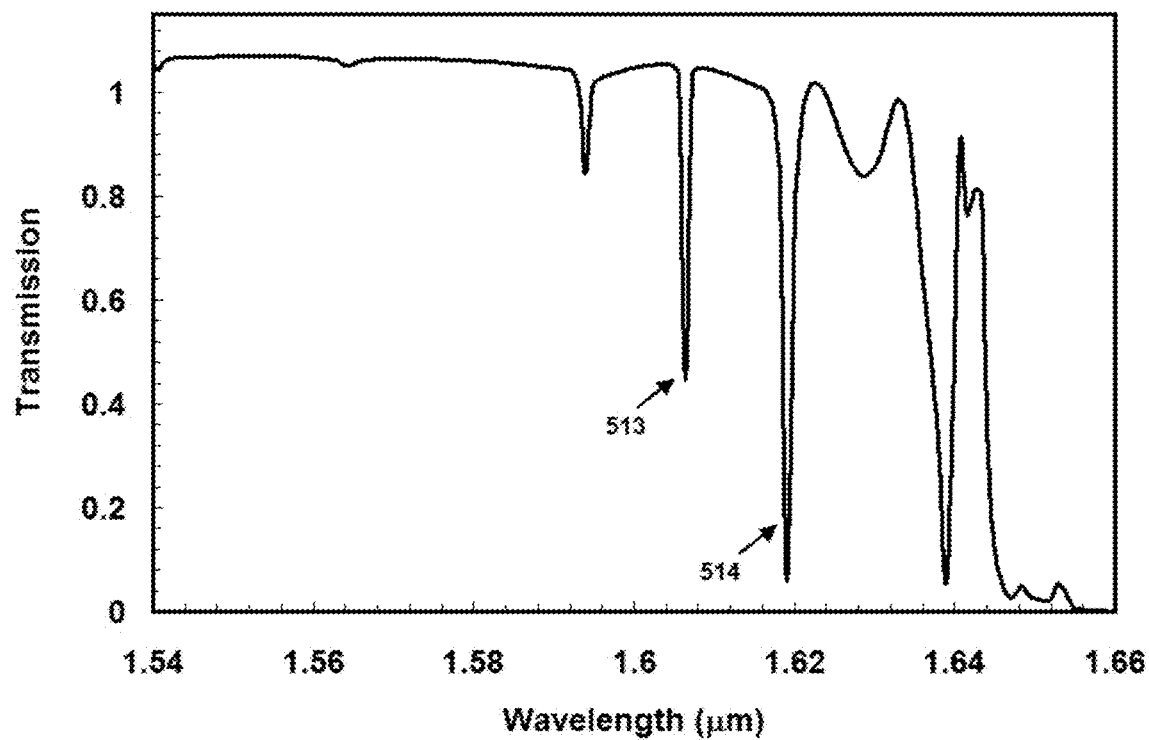
Figure 8C:
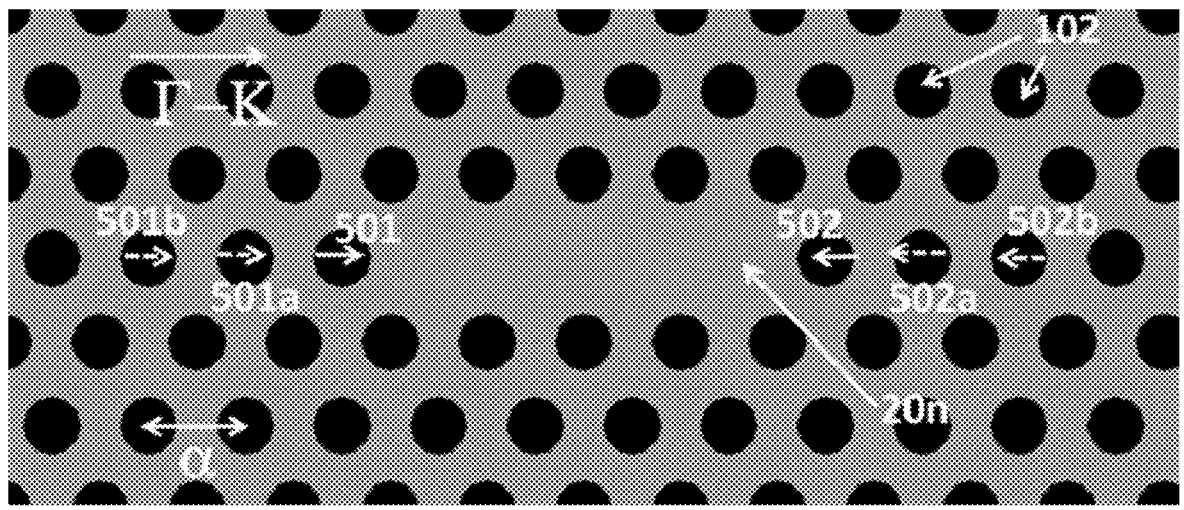
Figure 8D:
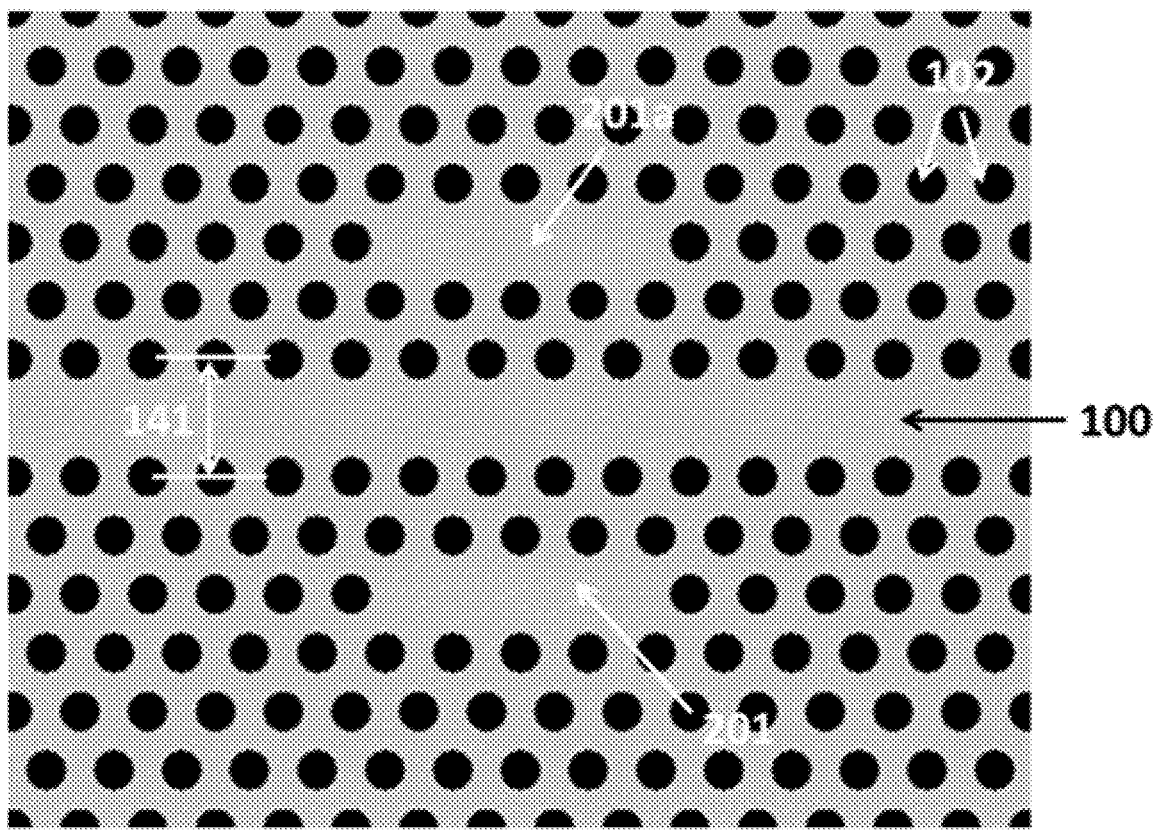
Figure 8E:
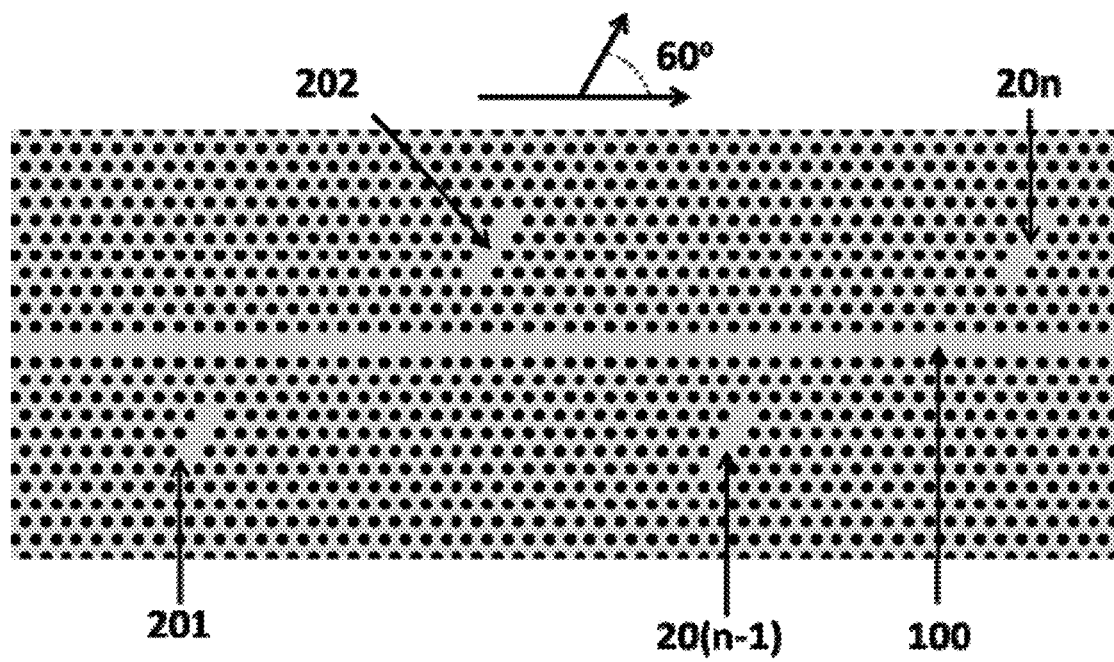
Figure 8F:
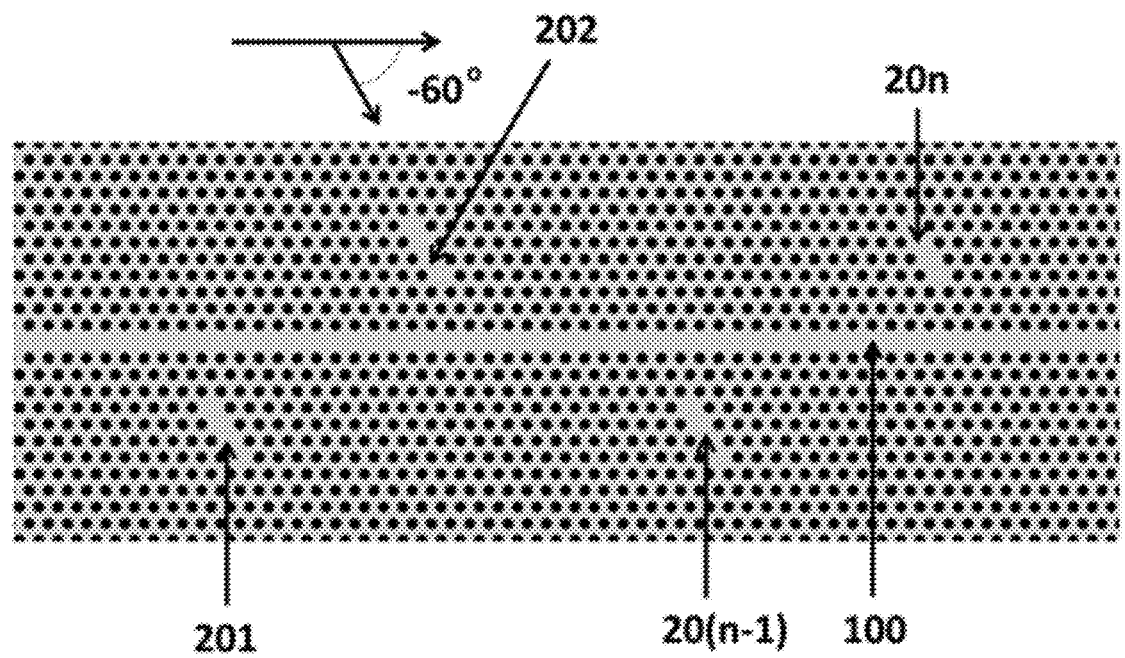

FIG. 8A shows a top view of a functional photonic crystal microcavity. Elements that are geometrically tuned in size and/or position are indicated. FIG. 8B shows the transmission spectrum when two representative photonic crystal microcavities of the embodiment depicted in FIG. 8A are coupled to the functional photonic crystal waveguide in FIG. 1A and FIG. 1B. FIG. 8C shows a top view of a functional photonic crystal microcavity where more than just the adjacent void columnar members have been shifted. FIG. 8D shows a top view of a composite microcavity comprising two functional photonic crystal microcavities mirrored across the waveguide core. FIG. 8E shows a top view of functional photonic crystal microcavities oriented along the +60 degrees orientation of the crystal lattice. FIG. 8F shows a top view of functional photonic crystal microcavities oriented along the −60 degrees orientation of the crystal lattice. It is shown that geometry tuning can shift resonant frequencies and optimum spacing between microcavities ensures no cross-talk between adjacent microcavities.

Figure 1A:
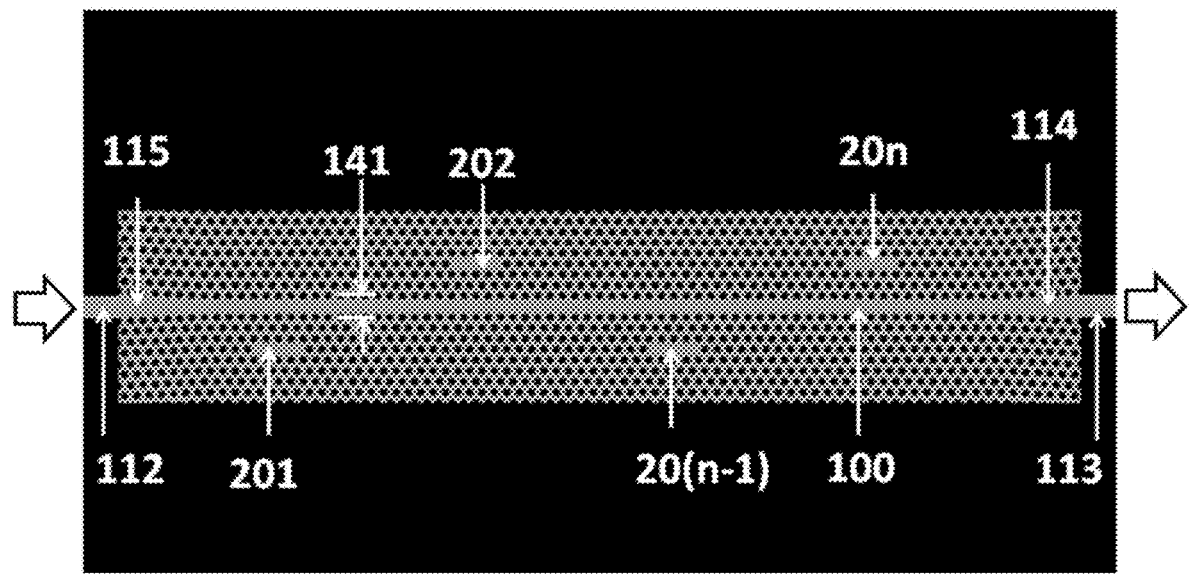
Figure 1B:
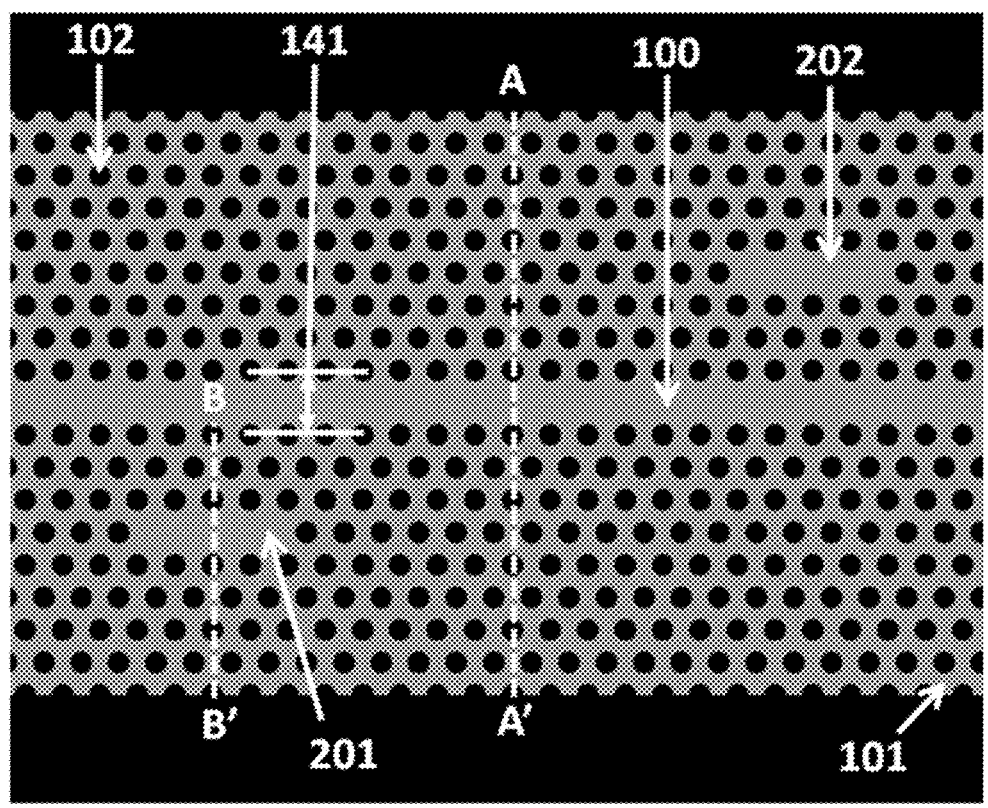
Figure 9:
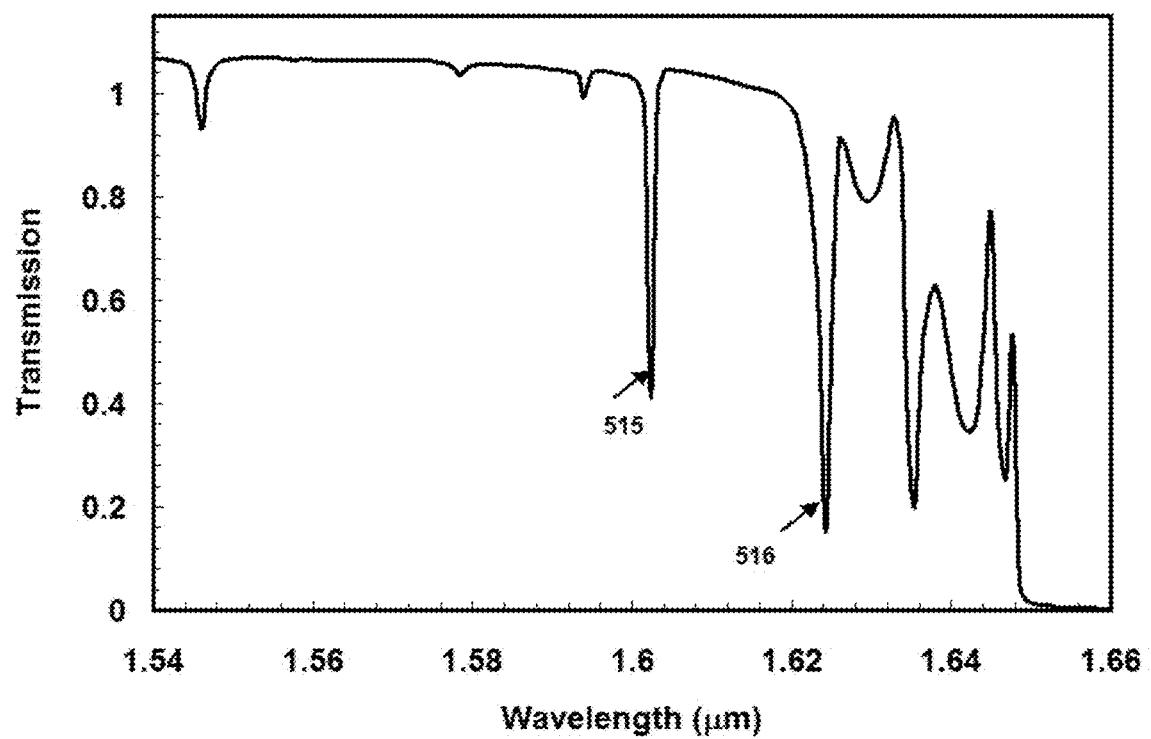

FIG. 9 shows another transmission spectrum of a functional photonic crystal waveguide with two representatively coupled photonic crystal microcavities of the embodiment depicted in FIG. 8A along the length of the functional photonic crystal waveguide in FIG. 1A and FIG. 1B. Two (2) microcavities are chosen, as a representative number for n. n can vary from 1 to N (N→∞). It is shown that geometry tuning can shift resonant frequencies; thereby allowing the potential to couple N photonic crystal microcavities in an array, each with a small difference in geometry, hence a small difference in resonant frequency and hence potential of the device to respond to multiple analytes, molecules, and biomolecules.

FIG. 10A through FIG. 10I show the steps in the fabrication of microfluidic channels on patterned silicon chips for target binding molecule delivery and subsequent removal to create arrays of target binding molecule coated photonic crystal microcavities. In another embodiment, no microfluidic channels are necessary and the target binding molecules immobilized on the microcavity are delivered by a nozzle from any equipment capable of dispensing small volumes of the target binding molecules, such as an ink-jet printer.

Figure 10A:
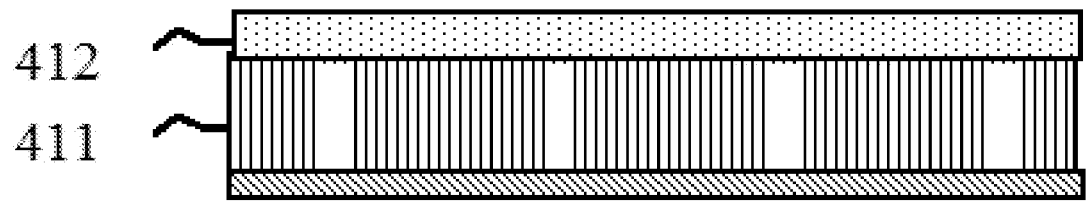
Figure 10B:
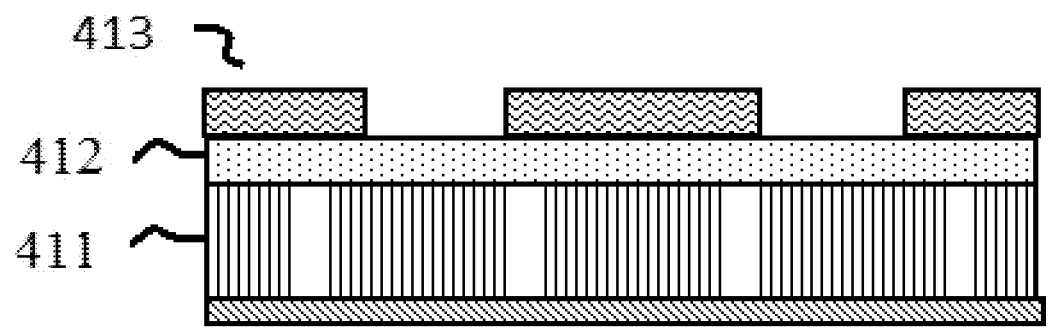
Figure 10C:
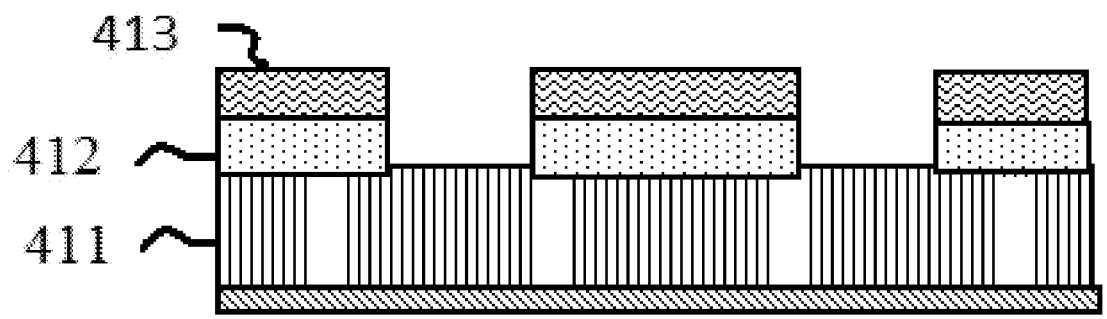
Figure 10D:
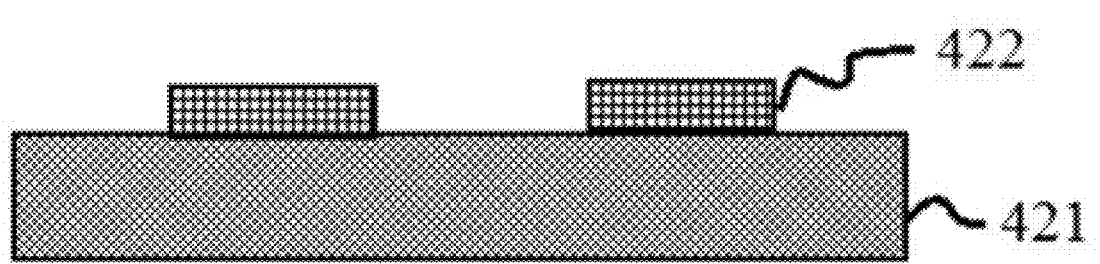
Figure 10E:
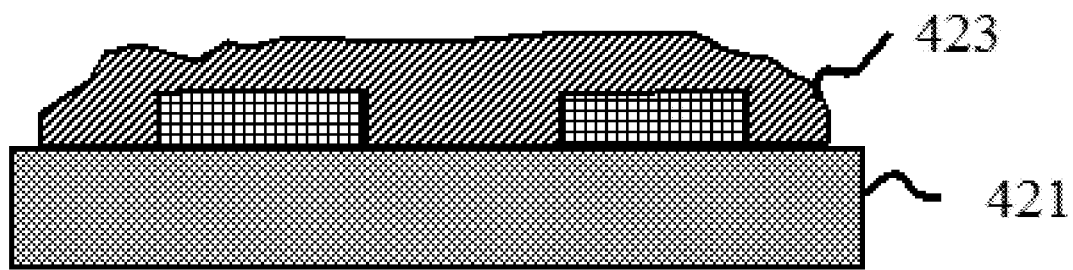
Figure 10F:
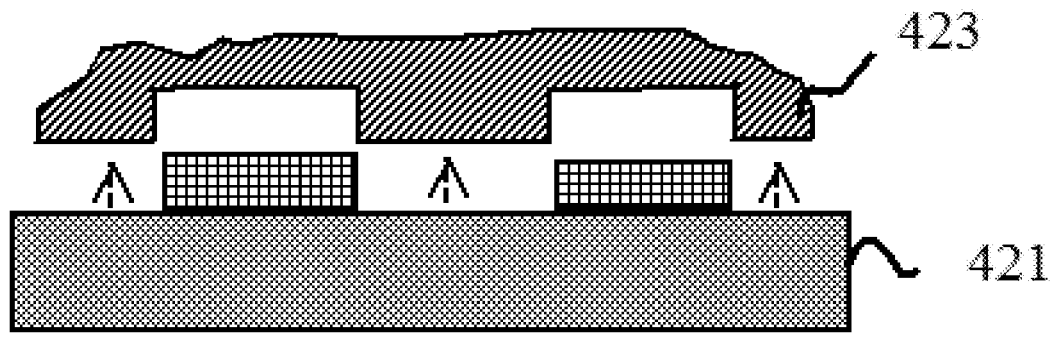
Figure 10G:
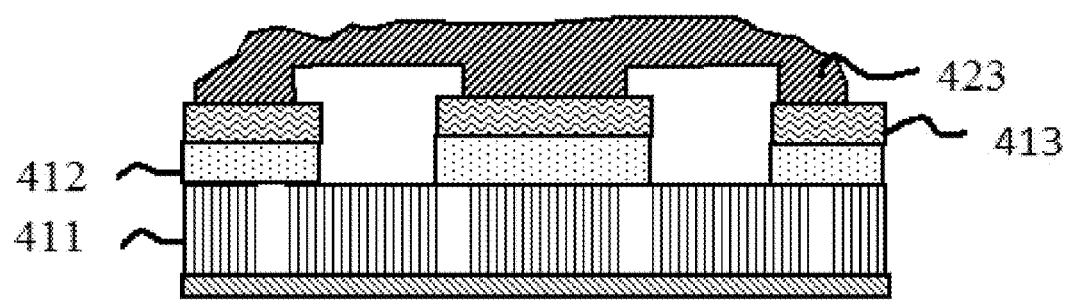
Figure 10H:
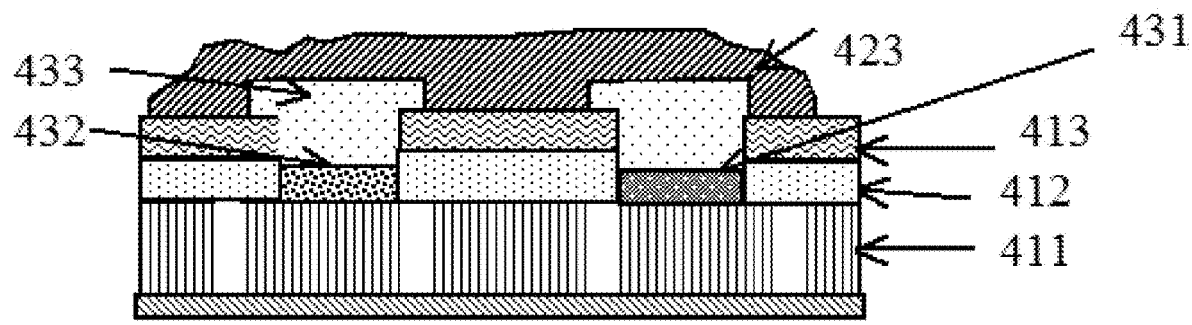
Figure 11:
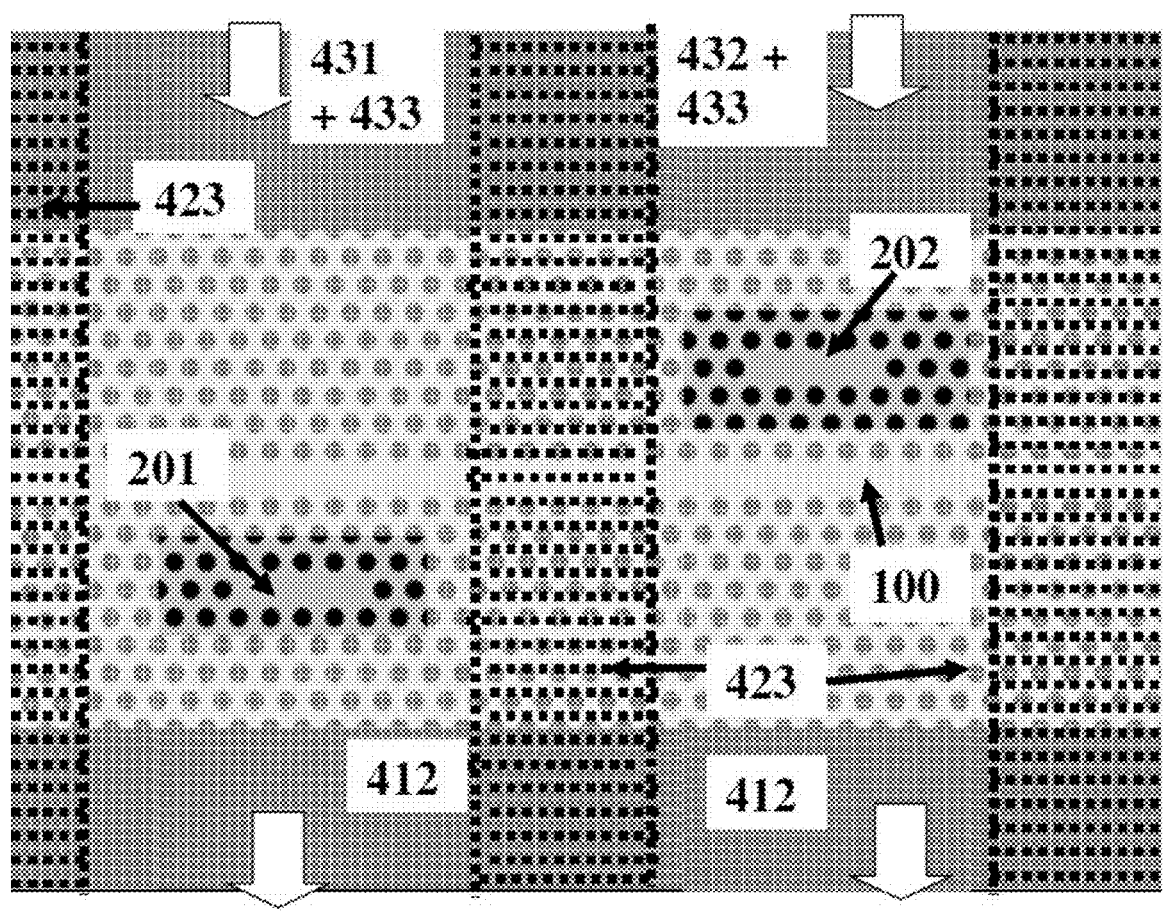

FIG. 11 is a top view of the device in FIG. 10G and FIG. 10H.

Figure 12A:
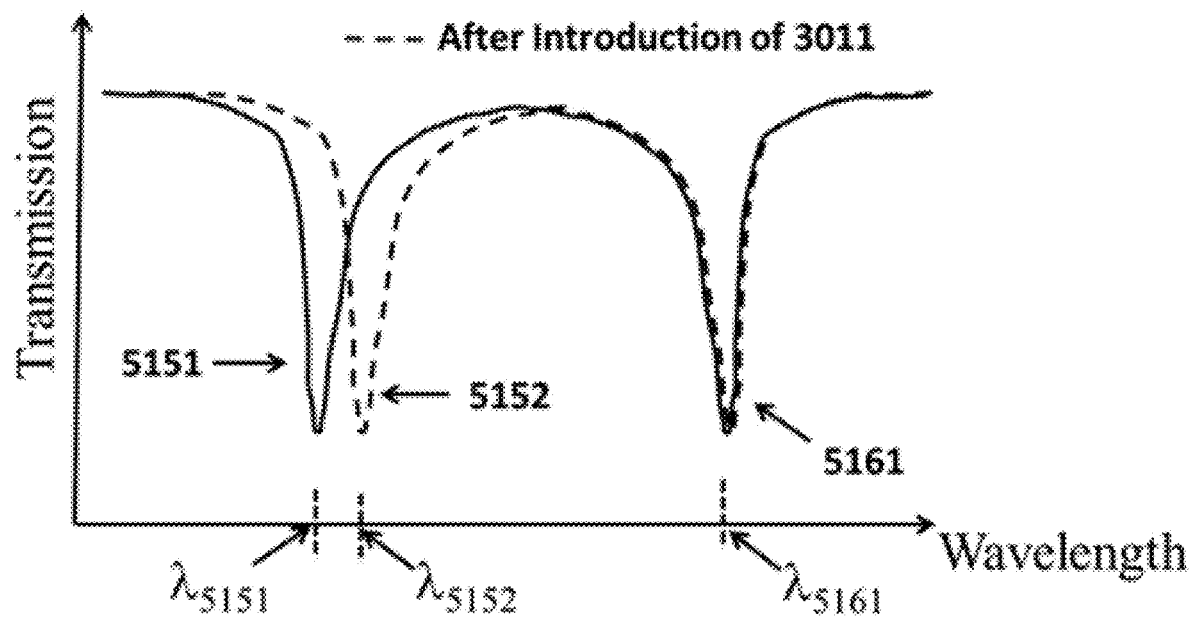
Figure 12B:
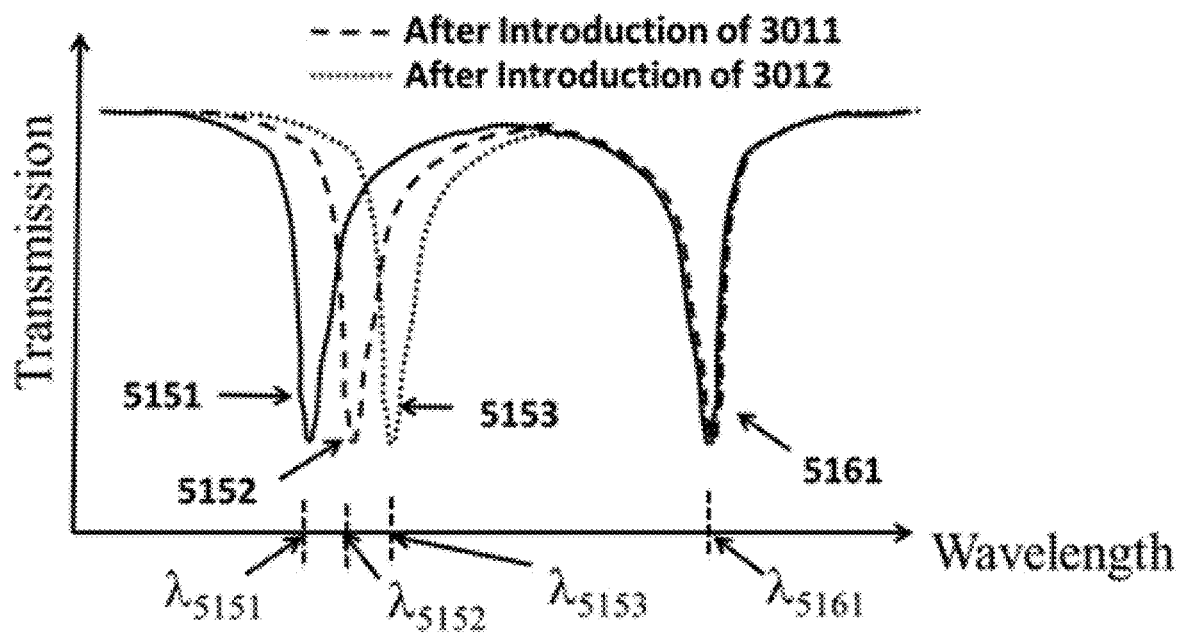

FIG. 12A and FIG. 12B show the changes in the transmission spectrum when a sandwiched measurement is performed that involves introduction of a secondary target binding molecule after the introduction of the analyte molecule or biomolecule, resulting in amplification of the sensitivity detection and enhancement of the specificity detection.

Figure 13:
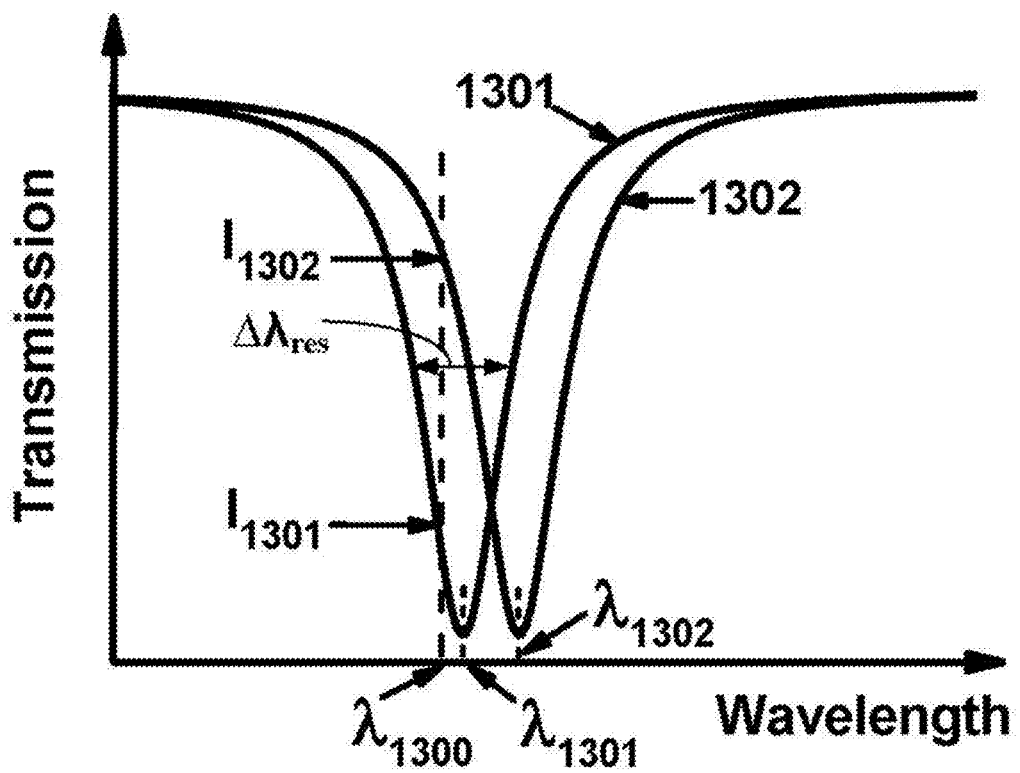

FIG. 13 shows the change in the transmission spectrum and thus how the procedure of the wavelength modulation method and the intensity modulation method is applied.

Figure 14A:
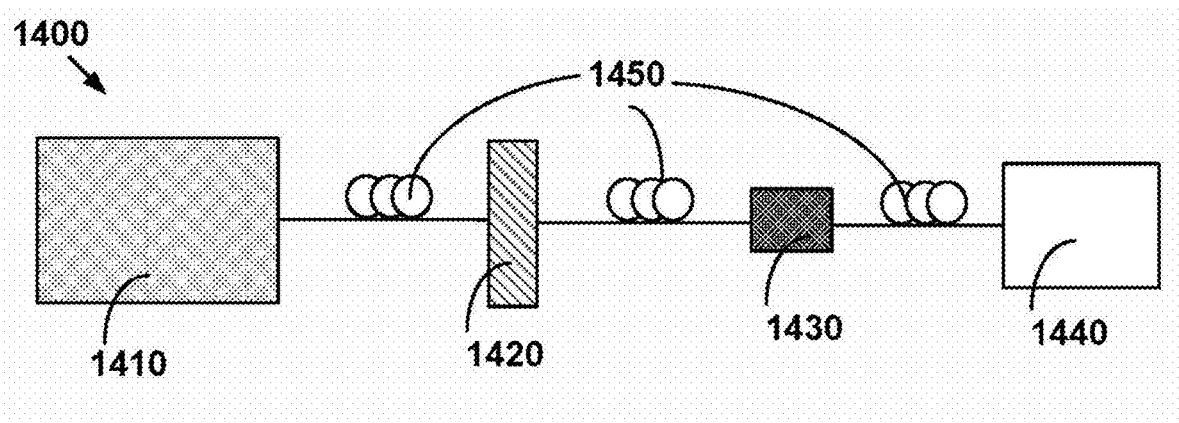
Figure 14B:
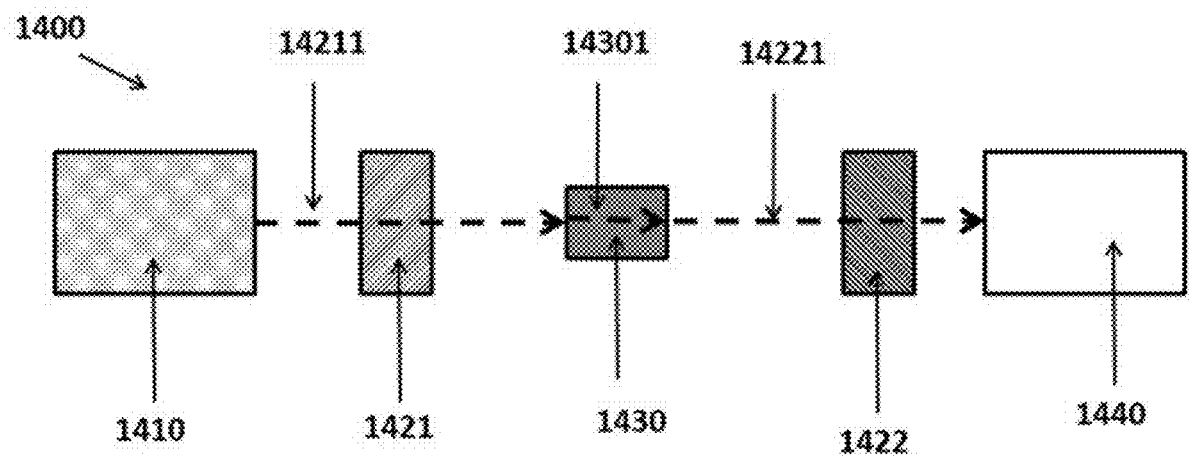

FIG. 14A and FIG. 14B show two embodiments for a system implementing the wavelength modulation method with a broadband light source and a spectrometer.

Figure 15A:
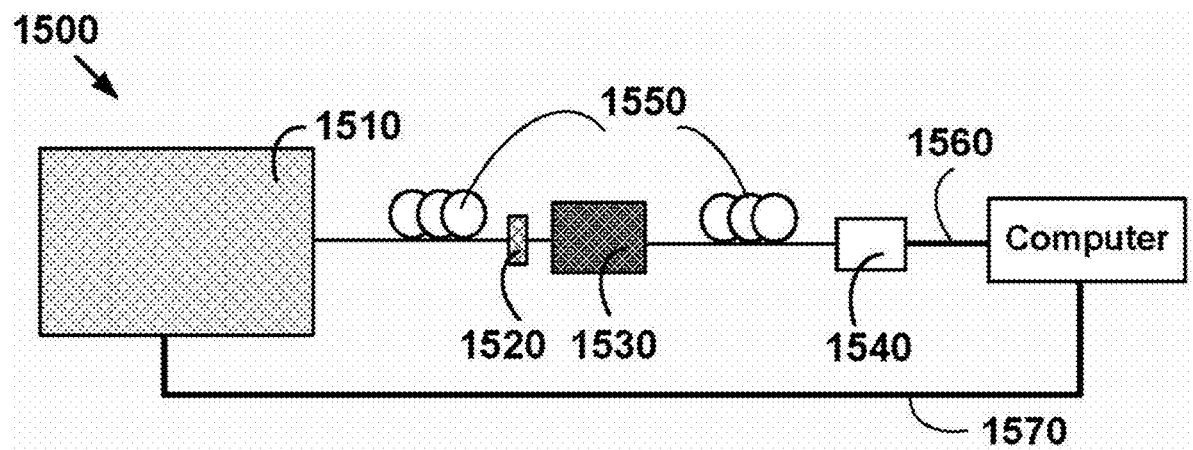
Figure 15B:
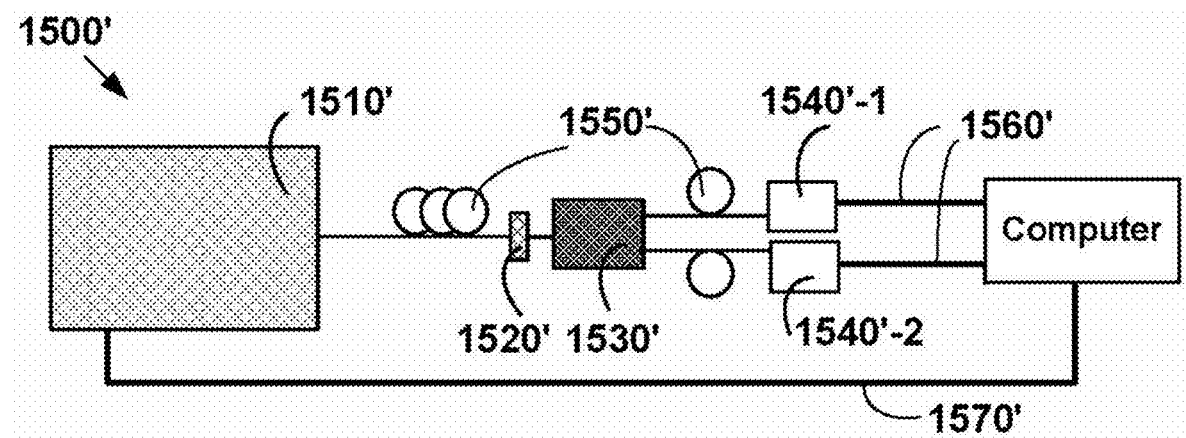

FIG. 15A shows the schematic of a system implementing the wavelength modulation method with a tunable laser source and a photodetector. FIG. 15B further implements a referencing method to improve the detection resolution of the system. Both the tunable laser source and photodetectors are controlled by a computer.

Figure 16A:
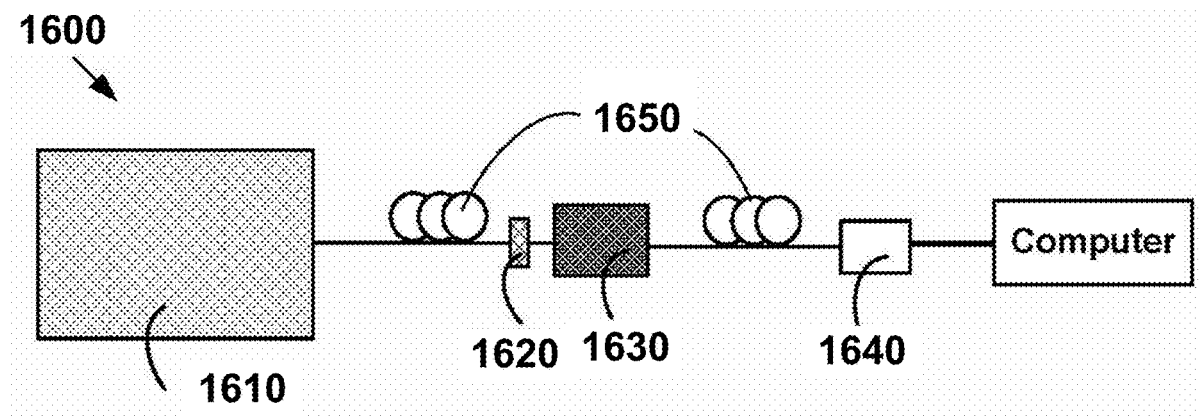
Figure 16B:
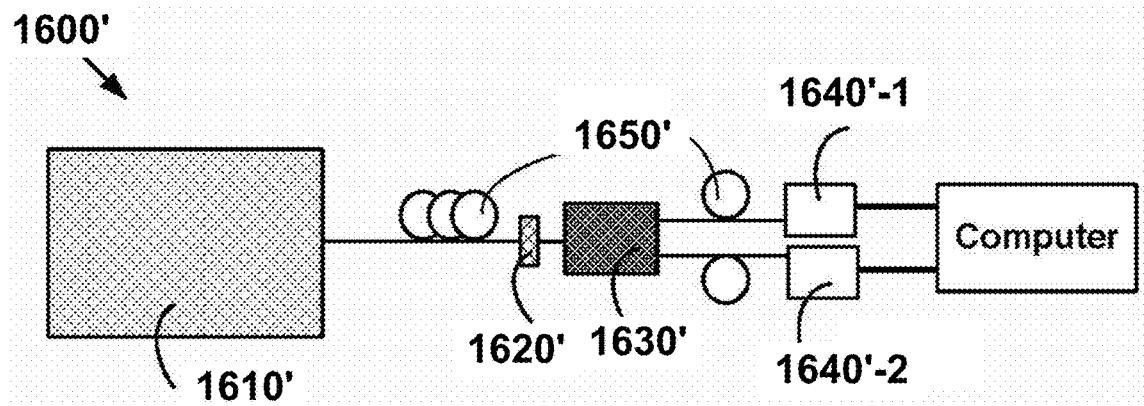
Figure 16C:
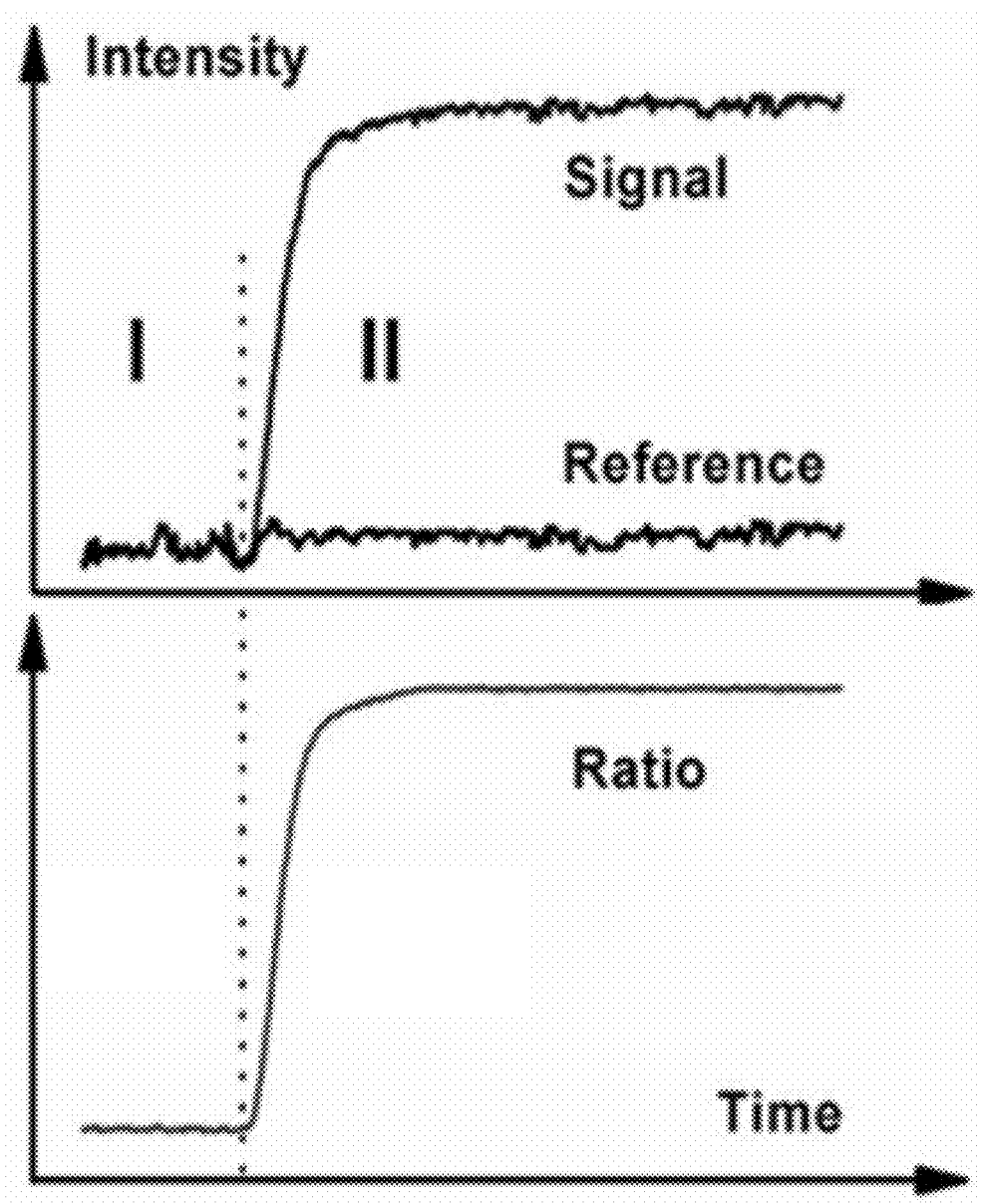

FIG. 16A shows the schematic of a system implementing the intensity modulation method with a single-wavelength laser source and a photodetector. FIG. 16B further implements a referencing method to improve the detection resolution of the system. FIG. 16C shows the sensorgram monitored by the transmitted signal intensity and by the normalized intensity ratio, where region I is the baseline of the photonic crystal sensor and region II reflects the real-time ambient medium changing or analyte adsorbed onto the sensor surface.

Figure 17A:
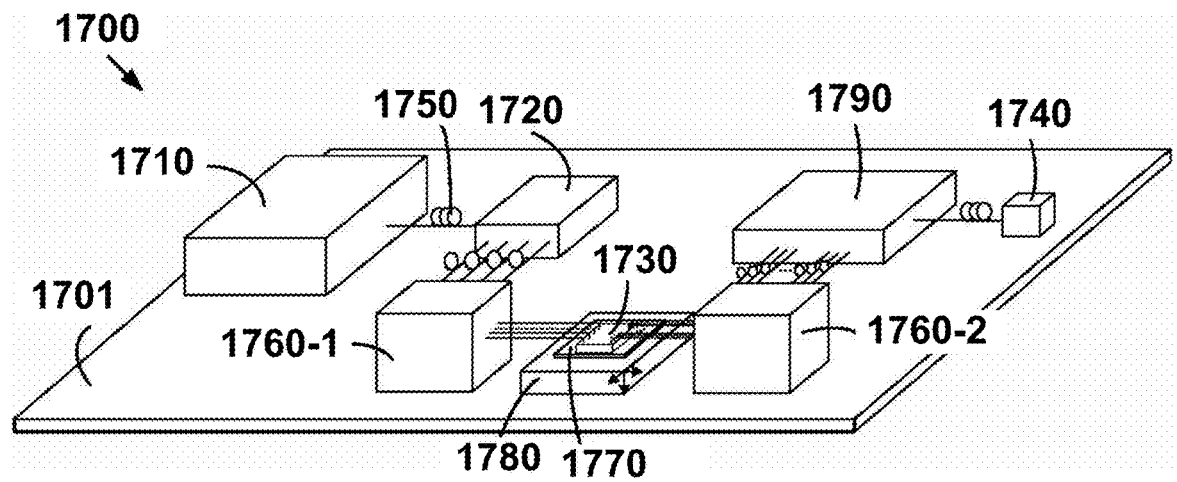
Figure 17B:
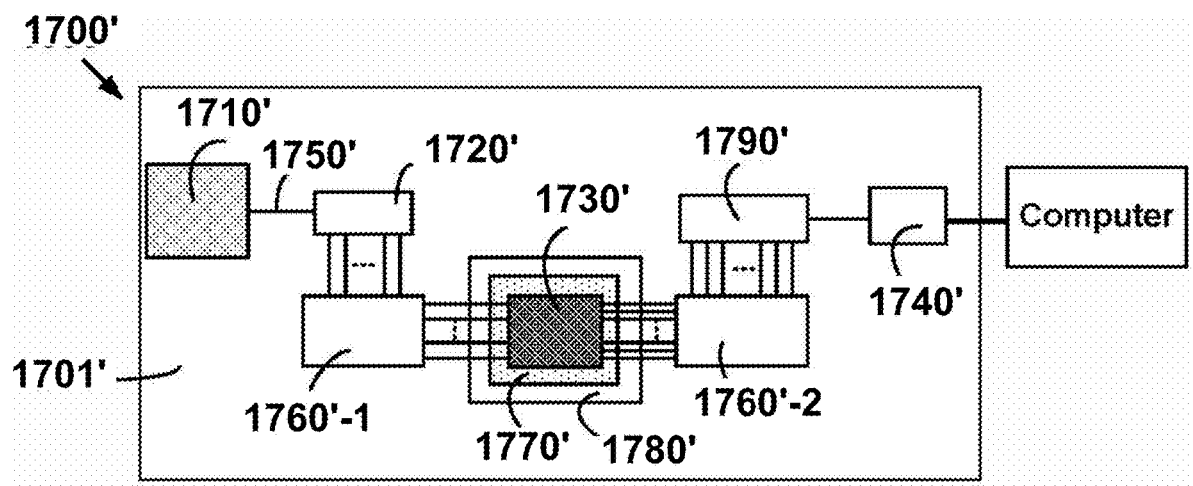
Figure 17C:
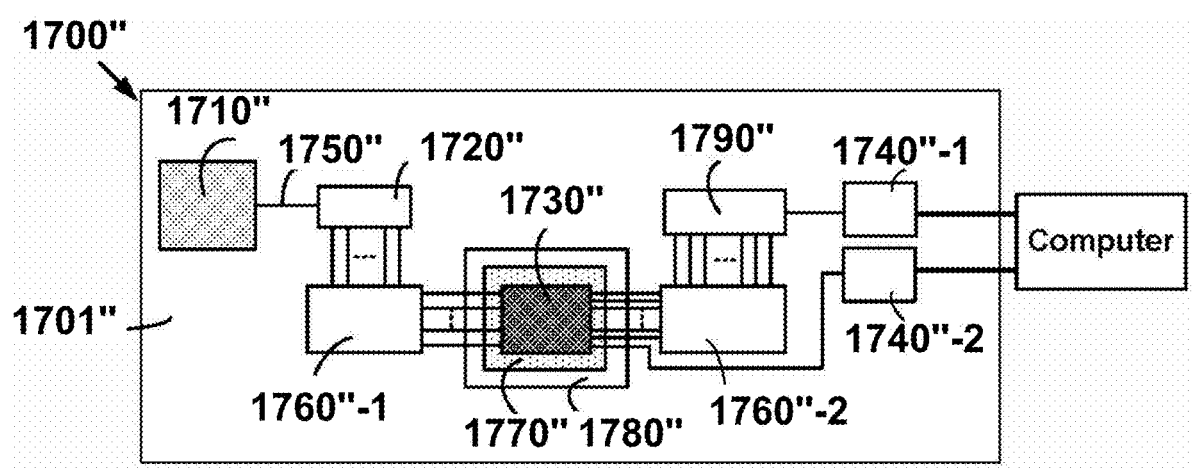

FIG. 17A shows the three-dimensional schematic of a system integrating the two dimensional photonic crystal sensor for multiplexing detections. FIG. 17B shows the two-dimensional schematic of the system. FIG. 17C further implements a referencing method to improve the detection resolution of the system.

Figure 18A:
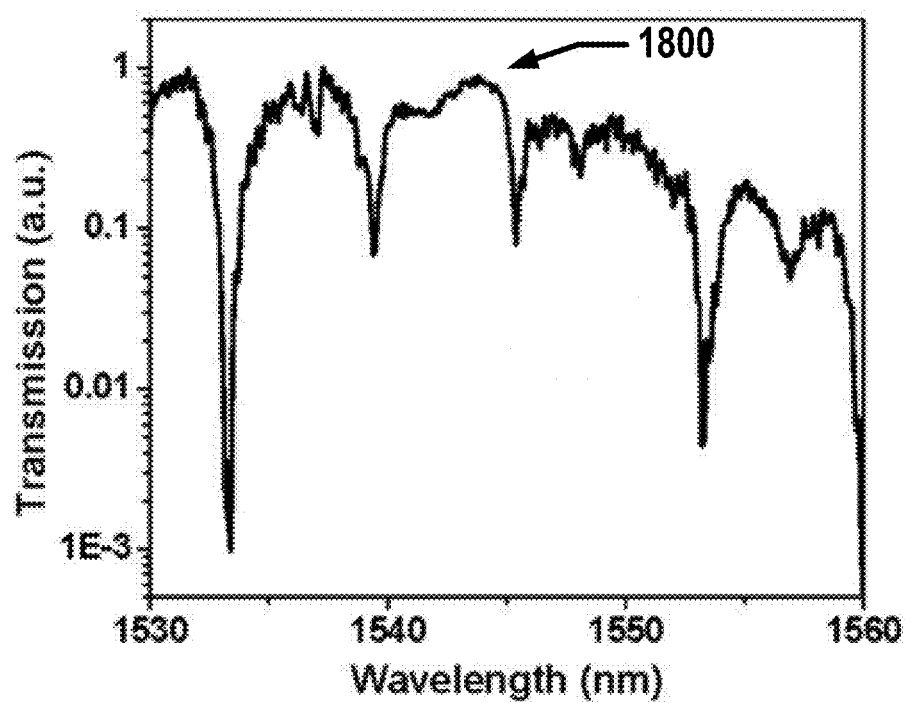
Figure 18B:
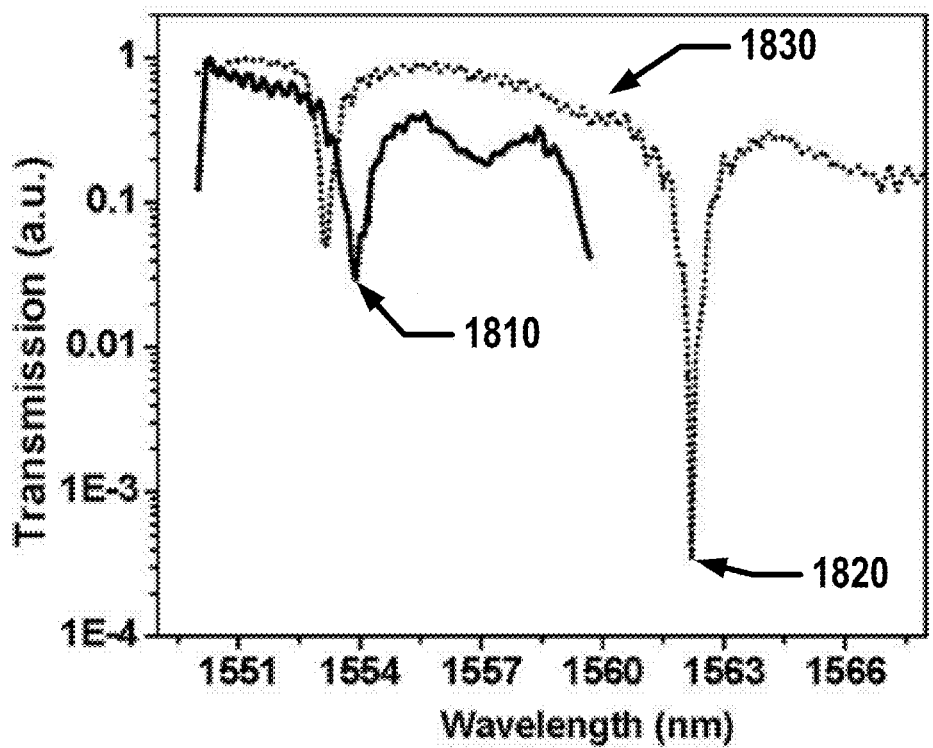
Figure 18C:
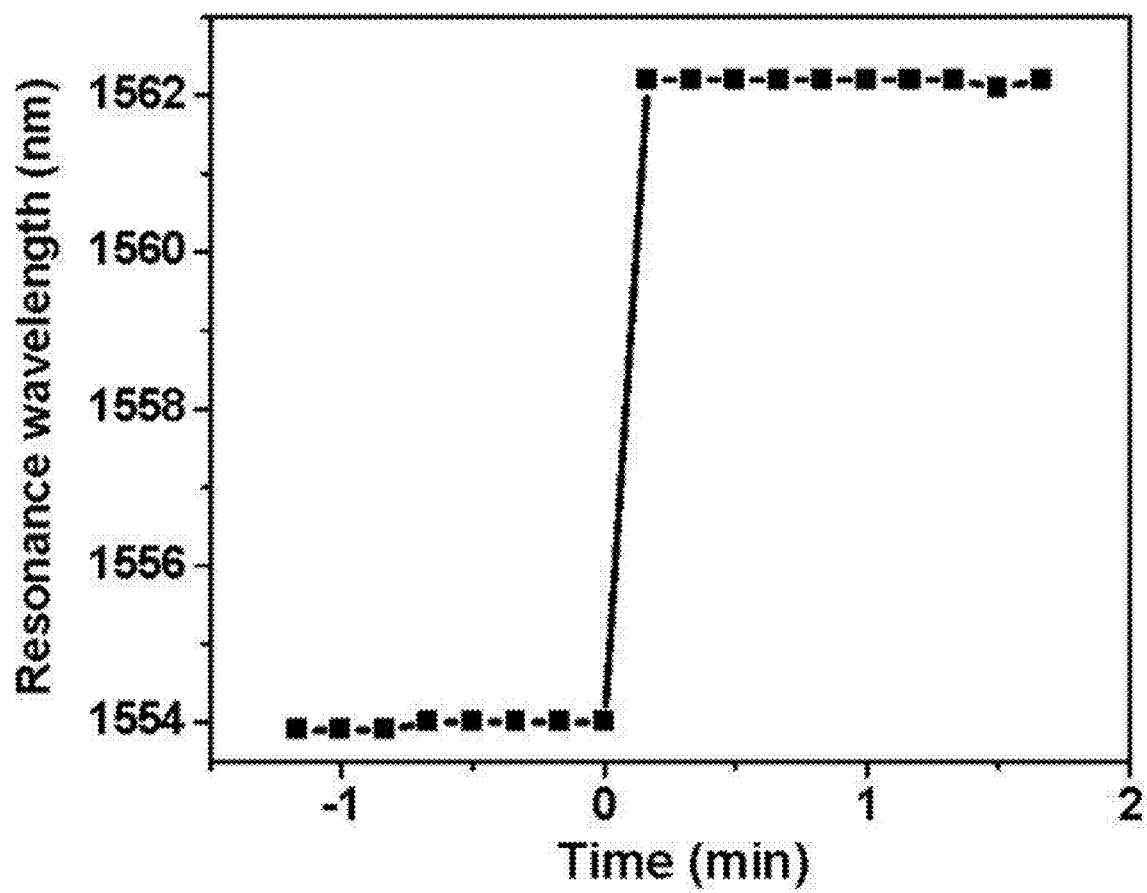

FIG. 18A shows the transmission spectrum with water as the ambient medium utilizing the system depicted in FIG. 15A. FIG. 18B shows the transmission spectrum with water and glycerol as the ambient medium utilizing the system depicted in FIG. 15A. FIG. 18C shows the sensorgram monitoring the shift of the resonance wavelength when the ambient medium changes from water to glycerol. FIG. 18D through FIG. 18J show the results of a typical biosensing experiment.

V. DETAILED DESCRIPTION

Detailed Description of the Invention

In accordance with a preferred embodiment of the present invention, a device for a microarray for personalized diagnostic applications comprises: a functional photonic crystal waveguide having a waveguide core along which light is guided, arrays of photonic crystal microcavities along the length of the photonic crystal waveguide each coated with a separate target binding molecule specific to disease identification, an input and output photonic crystal waveguide with gradually changed group index before and after the functional photonic crystal waveguide, which can bridge the refractive indices difference between conventional optical waveguides and the functional photonic crystal waveguide. The sensor can be used to detect organic or inorganic substances such as proteins, DNA, RNA, small molecules, nucleic acids, virus, bacteria, cells, and genes, without requiring labels such as fluorescence or radiometry. Light (from a broadband source or LED) coupled into a photonic crystal waveguide couples with the resonance of a photonic crystal microcavity and thereby drops the resonant wavelength in the microcavity, leading to a minimum in the transmission spectrum of the photonic crystal waveguide at the resonant wavelength. Output transmission spectra are measured by a spectrometer such as an optical spectrum analyzer or simply a photodetector. Transmission minima are observed for each resonant wavelength of the individual microcavities along the photonic crystal waveguide. The resonance wavelength shifts to longer wavelengths in response to the attachment of a material on the microcavity surface leading to the corresponding shift of the transmission minimum of that microcavity.

In another embodiment of the present invention, a device for a microarray for multiple analyte sensing applications comprises: a functional photonic crystal waveguide having a waveguide core along which light is guided, arrays of photonic crystal microcavities along the length of the photonic crystal waveguide each coated with a separate polymer or hydrogel specific to a unique environmental parameter, an input and output photonic crystal waveguide with gradually changed group index before and after the functional photonic crystal waveguide, which can bridge the refractive indices difference between conventional optical waveguides and the functional photonic crystal waveguide. The sensor can be used to detect changes in temperature, pressure, humidity, molarity of solution, acidity or alkalinity (pH) of aqueous medium, ion concentration of solutions, trace gases in the atmosphere, pollutants in ground water that can be organic or inorganic, volatile and non-volatile, pesticides and thereof in a single optical transmission measurement. A unique polymer or hydrogel is chosen with maximum response to changes in each of the above parameters and a unique microcavity along the waveguide is coated with a unique polymer or hydrogel. Light (from a broadband source or LED) coupled into a photonic crystal waveguide couples with the resonance of a photonic crystal microcavity and thereby drops the resonant wavelength in the microcavity, leading to a minimum in the transmission spectrum of the photonic crystal waveguide at the resonant wavelength. Output transmission spectra are measured by a spectrometer such as an optical spectrum analyzer or simply a photodetector. Transmission minima are observed for each resonant wavelength of the individual microcavities along the photonic crystal waveguide, in the pristine condition. The resonance wavelength shifts to longer wavelengths in response to changes in ambient parameters listed above leading to the corresponding shift of the transmission minimum of that microcavity. The amount of transmission minimum shift determines the absolute change in ambient conditions in the vicinity of the microarray device.

For the measurement of environmental parameters in situ, the device is incorporated with a filter to remove macroscopic dirt and dust particles. The filter can be a macroscopic filter incorporated off-chip or a microfluidic filter incorporated on-chip.

Methods for fabricating photonic crystal structures are widely described in the literature. Sensor structures of the invention have higher sensitivity than previous structures due to the use of two-dimensional photonic crystal microcavities with resonances that have high quality factor together with the slow light effect of two-dimensional photonic crystal waveguides. Methods for patterning of multiple target binding molecules exclusively on photonic crystal microcavities that preserves target binding molecule functionality in aqueous phase are disclosed. The amount of refractive index change and hence the shift in resonance frequency is determined by the amount of adsorbed molecules or biomolecules on the microcavity surface that interacts with the electromagnetic field of the photonic crystal. The system is capable of detecting a single cell attached to its surface.

Microarrays provide an unprecedented opportunity for comprehensive concurrent analysis of thousands of biomolecules such as proteins, genes, DNA molecules, small molecules or nucleic acids. The global analysis of the response to a toxic agent, as opposed to the historical method of examining a few select biomolecules, provides a more complete picture of toxicologically significant events. Array-based expression profiling is useful for differentiating compounds that interact directly with the species from those compounds that are toxic via a secondary mechanism. Microarrays are consequently finding numerous applications in pathogen detection and biodefense. The sensors have utility in the fields of pharmaceutical research (e.g., high throughput screening, secondary screening, quality control, cytoxicity, clinical trial evaluation), life science research (e.g., proteomics, protein interaction analysis, DNA-protein interaction analysis, enzyme-substrate interaction analysis, cell-protein interaction analysis), diagnostic tests (e.g., protein presence, cell identification), environmental detection (bacterial and spore detection and identification), and biowarfare defense.

The principles of the invention can also be applied to e.g., evanescent wave based biosensors and any biosensors incorporating an optical waveguide. The principle can also be applied to arrays of ring or disk resonators coupled to a bus waveguide. However such waveguides provide limited free-spectral range for microcavity resonances and also do not incorporate slow light effect of photonic crystal waveguides and are thus less sensitive with low signal-to-noise ratio.

Detailed descriptions of the preferred embodiments are provided herein. It is to be understood, however, that the present invention may be embodied in various forms. Therefore, specific details disclosed herein are not to be interpreted as limiting, but rather as a basis for the claims and as representative basis for teaching one skilled in the art to employ the present invention in virtually any appropriately detailed system, structure, or manner.

Defect engineered photonic crystals, with sub-micron dimensions have already demonstrated high sensitivity to trace volumes of analytes. While biosensing has been demonstrated in photonic crystal devices with single biomolecules, no previous effort has been made to extend the device capability to microarrays. Particularly, patterning of multiple target binding molecules on a few micron scales has faced challenges of binding exclusivity and binding specificity. Our proposed device consists of an array of photonic crystal microcavity resonators coupled to a single photonic crystal waveguide that give rise to minima in the photonic crystal waveguide transmission spectrum at the resonance frequency of the microcavity. Using microfluidics or ink jet printing, individual target binding molecules are coated exclusively on individual photonic crystal microcavities. Our method eliminates labeling for analyte identification and is thus label-free. The impact of our novel and robust multi-analyte sensing technique can reach much further than the field of biomolecular science and diagnostics alone. This section will provide detailed description of the preferred embodiments in the aspect of device architecture, as well as the design concept and working principle.

Figure 2A:
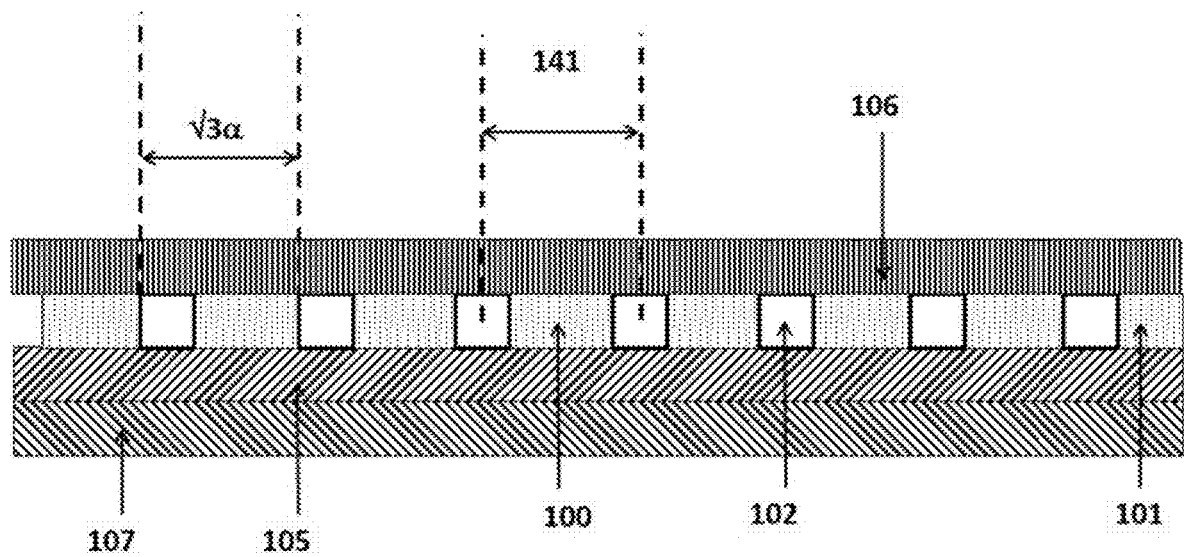
FIG. 2A and FIG. 2B are cross-sectional views of the device shown in FIG. 1B taken along line A-A'.
Figure 2B:
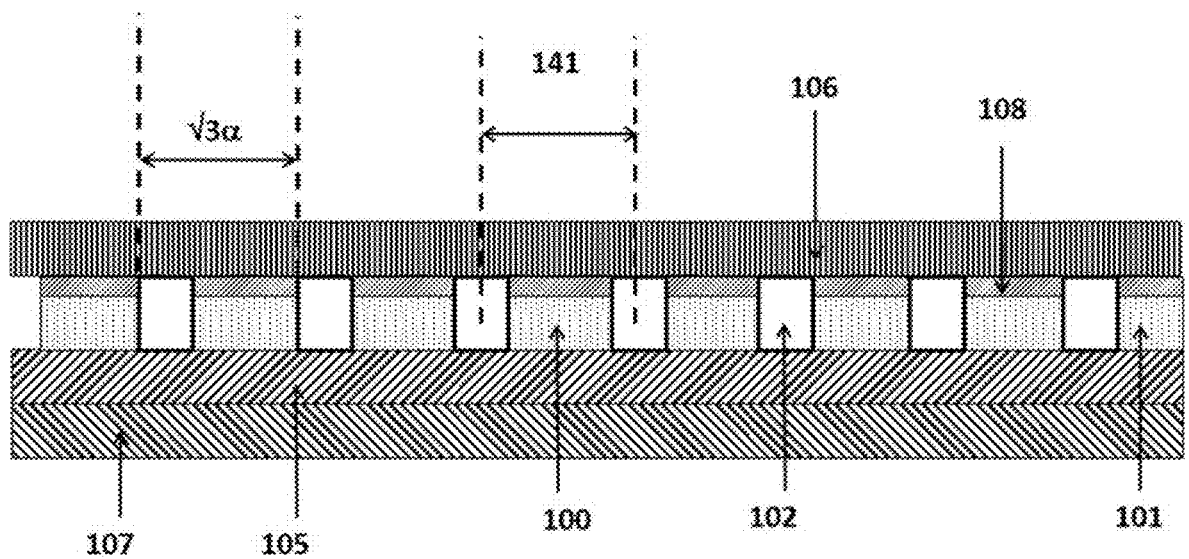

FIG. 1A presents a top view schematic drawing of a photonic crystal microarray. It comprises a functional photonic crystal waveguide 100, input ridge waveguide 112, output ridge waveguide 113, and an array of N photonic crystal microcavities 20$n$ where n represents digits and ranges from 1 to N (N→∞). The functional photonic crystal waveguide 100 includes a number of column members 102 (labeled in FIG. 1B) etched through or partially into the semiconductor slab 101 (labeled in FIG. 1B). The waveguide core 141 is defined as the space between the centers of two column members adjacent to the region where the columns are absent. In one preferred embodiment, the column members 102 (labeled in FIG. 1B) are arranged to form a periodic lattice with a lattice constant α. In some embodiments, the width of waveguide core 141 can range from 0.5 times sqrt(3) times the lattice constant α to 50 times sqrt(3) times the lattice constant α. The arrows indicate the direction in which electromagnetic waves are coupled into and out of the photonic crystal waveguide respectively. In the figure, due to space limitations, the microcavities are designated as 201, 202, . . . , 20($n$−1), and 20$n$ respectively. The photonic crystal microcavities are parallel to the photonic crystal waveguide and are placed 3 lattice periods away from the waveguide. Although the photonic crystal microcavities have been shown at 3 lattice periods away from the photonic crystal waveguide, the offset can be 1, 2, . . . 10 lattice periods. Beyond 10 lattice periods, the coupling efficiency of light from the guided light in the photonic crystal waveguide will be very small. FIG. 1B is an enlarged section of FIG. 1A showing the photonic crystal microcavity elements 201, 202, columnar members 102, and photonic crystal waveguide 100 in greater detail. The photonic crystal waveguide 100 is defined by filling a complete row of columnar members with the semiconductor slab material 101. Similarly, a photonic crystal microcavity, for instance 201, is defined by filing a row of 4 columnar members 102 with semiconductor material 101. The distance between individual photonic crystal microcavities is 12 periods. The photonic crystal microcavity 201 can have different geometries as described in the literature. The resonant wavelength of a photonic crystal microcavity is dependent on the geometry of the microcavity. Light propagating in a photonic crystal waveguide couples to a photonic crystal microcavity at the resonant wavelength of the microcavity. The transmission spectrum of the photonic crystal waveguides consequently shows minima corresponding to the resonant wavelength of each photonic crystal microcavity. With reference to FIG. 2A, which is a cross-sectional view of the functional photonic crystal waveguide 100 in FIG. 1B taken along line A-A', the column members 102 extend throughout the thickness of the slab 101 to reach a bottom cladding 105. In one embodiment, the top cladding 106 is air. However, the top cladding can be any organic or inorganic dielectric material, columnar members 102 can extend through both 106 and 101 as well as through the bottom cladding 105 to reach the substrate 107. In one embodiment, a thin film of silicon dioxide 108 is deposited above the slab 101. In this instance, the columnar members 102 also extend through the film of silicon dioxide 108 as shown in FIG. 2B. The film of silicon dioxide can be deposited by plasma enhanced chemical vapor deposition (PECVD). When the slab 101 is made from silicon, the thin film 108 can be formed by thermal oxidation in a high temperature furnace that oxidizes a fraction of the slab 101, the thickness of the film 108 being determined by the time of oxidation. When the slab 101 is silicon, the thin film 108 of silicon dioxide can also be formed by oxygen plasma ashing process that forms approximately a 3 nm thickness film 108 of silicon dioxide. The thickness of the silicon dioxide film 108 can be between 0 nm to 50 nm. In some instances, the film 108 is silicon nitride. Although the structure within the slab 101 is substantially uniform in the vertical direction in this embodiment, vertically non-uniform structure, such as the columnar members 102 whose radii are varying along the vertical direction, may be used as well. The column members 102 can be either simply void or filled with other dielectric materials. Between the ridge waveguide 112 and the core photonic crystal waveguide 100, there is an impedance taper 115 for coupling of light from ridge waveguide to photonic crystal waveguide with high efficiency. Similarly, at the output, between the photonic crystal waveguide 100 and the output ridge waveguide 113, there is another impedance taper 114 for better coupling efficiency. The impedance taper 115 is formed by shifting the columnar members from photonic crystal waveguide 100 to ridge waveguide 112 by x times α in the direction perpendicular to 100, in the plane of the waveguide, in steps of (x times α)/p where p is a number greater than 5, α is the lattice constant, and x varies from 0 to z, where z is a fractional number between zero and one (0<z<1). In FIG. 1A, p equals 8 since it is the first eight columnar members that have been shifted in both of the impedance tapers 115 and 114. In some embodiments, the impedance tapers 115 and 114 may be oppositely tapered. In that embodiment, impedance taper 115 would be narrower at the ridge waveguide 112 than at the photonic crystal waveguide 100 and impedance taper 114 would be narrower at the ridge waveguide 113 than at the photonic crystal waveguide 100. In this embodiment, x varies from 0 to z, where z is a fractional number between zero and minus one (−1<z<0). For a photonic crystal waveguide 100, 114, and 115, which comprise photonic crystals of two-dimensional periodicity, the wave guiding in the vertical direction must be provided by conventional index-guiding scheme. This means a bottom cladding 105 and a superstrate 106 with a lower effective index relative to that of the slab material must be disposed below and above the slab 101. On one side, the bottom cladding 105 and superstrate 106 prevent the guided lightwave escaping far away from the bottom and top surfaces, respectively, of the slab 101. In most applications, it is desirable that the waveguide have a single guided mode, which can be achieved through adjusting the width of the waveguide core 141.

Figure 3:
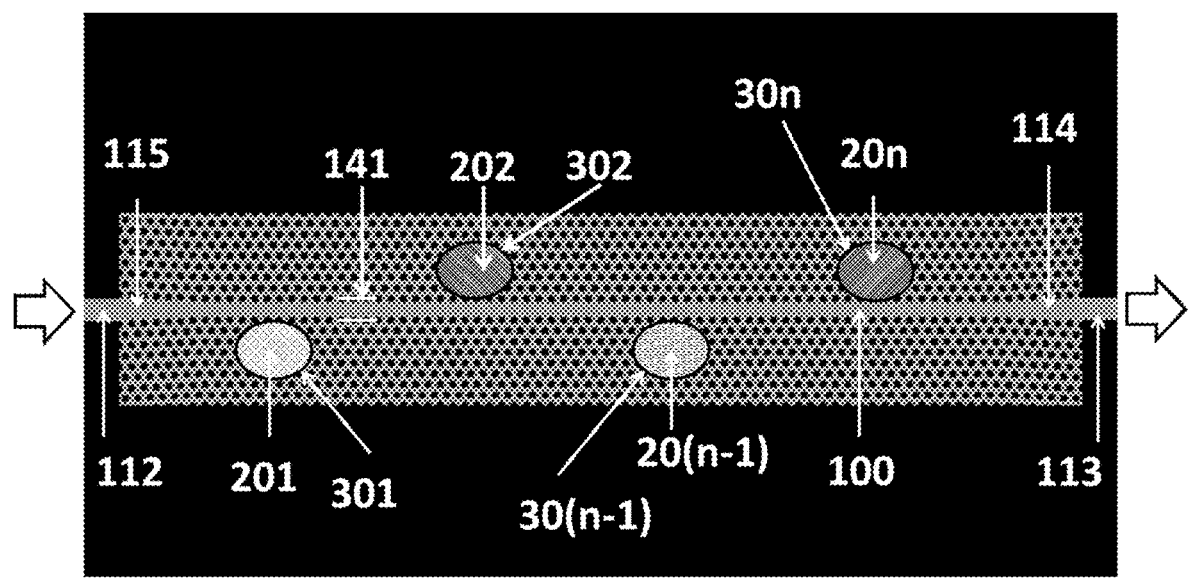
FIG. 3 is a top view of one embodiment of a photonic crystal microarray device based on an array of N photonic crystal microcavities coupled to a photonic crystal waveguide where each photonic crystal microcavity is coated with a different target binding molecule.

In FIG. 3, substances coated on the photonic crystal microcavity are labeled as 301, 302, . . . , 30(n−1), 30n, where n represents digits and ranges from 1 to N (N→∞). Each photonic crystal microcavity 20n is coated with a specific substance 30n. In one embodiment, the substance can be a target binding molecule such as proteins, nucleic acids, DNA, RNA, antigens, antibodies, small molecules, peptides, genes etc. Each target binding molecule can be specific to a particular disease causing conjugate where the disease of interest can be cancer, malaria, Leptospirosis, or any infectious disease to achieve specific detection. In another embodiment, the substance 30n can be a hydrogel that swells in the presence of a specific analytical solution or ambient gas wherein the ambient gas includes, but is not limited to, greenhouse gases such as carbon dioxide, methane, nitrous oxide or other gases such as oxygen, nitrogen thereof. In yet another embodiment, the substance can be a polymer that changes its effective refractive index upon contact with a chemical substance or proportionately to changes in temperature, humidity, and pressure thereof. The device is therefore a very generalized construction where multiple polymer or biological molecules, each specific to detection of a specific species, are arrayed for simultaneous detection.

Figure 4:
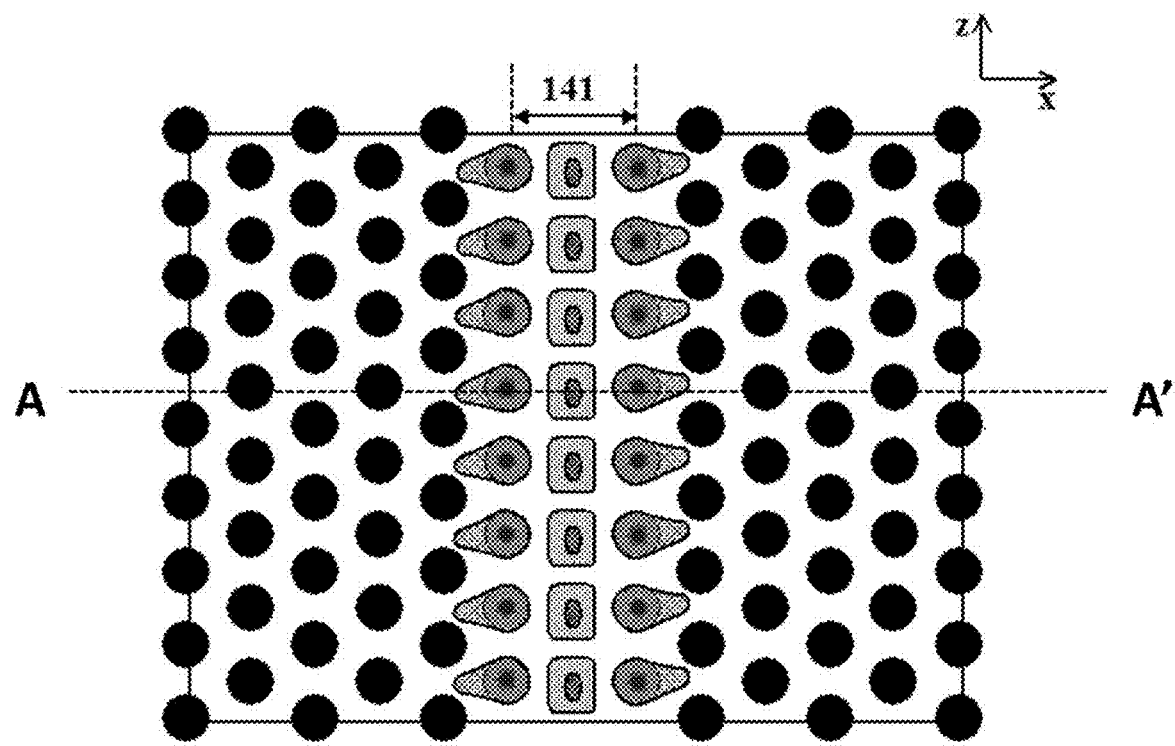
FIG. 4 is a top view of the field intensity pattern of a guided mode of a photonic crystal waveguide depicted in FIG. 1B taken along line A-A'.

FIG. 4 depicts a top view of the field intensity pattern of a guided mode of a waveguide 100 in FIG. 1A and FIG. 3. The circles indicate columnar members of the photonic crystal waveguide. It is seen in FIG. 4 that the peak of the field intensity is well confined inside the waveguide core region 141. Outside of 141, there are two side peaks due to evanescent field. Due to the even symmetry of the mode with respect to the center of the waveguide, the mode couples very well with the resonant modes of the photonic crystal microcavities which possess even symmetry.

Figure 5:
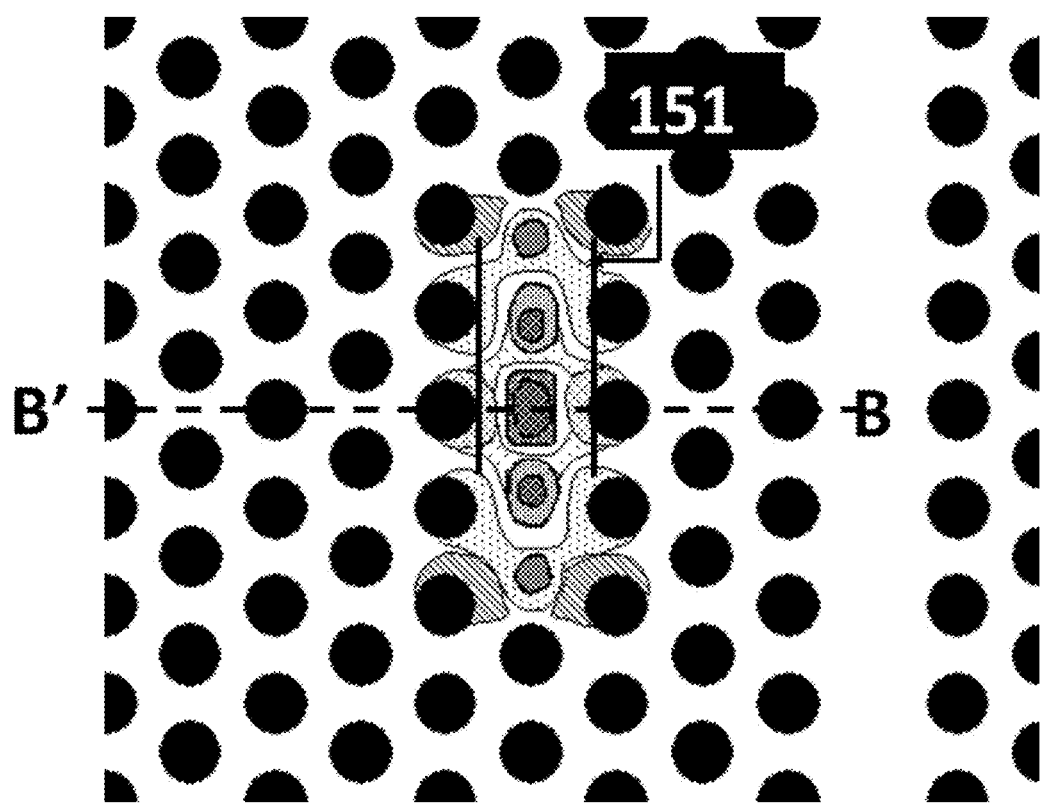
FIG. 5 is a top view of the field intensity pattern of a photonic crystal microcavity defect mode for the linear microcavity depicted in FIG. 1B taken along line B-B'.

FIG. 5 depicts a top view of the field intensity pattern of a defect mode of a photonic crystal microcavity 20n where n represents digits and ranges from 1 to N (N→∞), in FIG. 1A and FIG. 1B. The circles indicate columnar members of the photonic crystal microcavity. It is seen in FIG. 5 that the peak of the field intensity is well confined inside the photonic crystal microcavity region 151. Outside of 151, there is very weak field intensity that overlaps with the columnar members. FIG. 5 suggests that the photonic crystal microcavity resonant mode is well confined in the dielectric, in the plane of the waveguide inside region 151.

Figure 6:
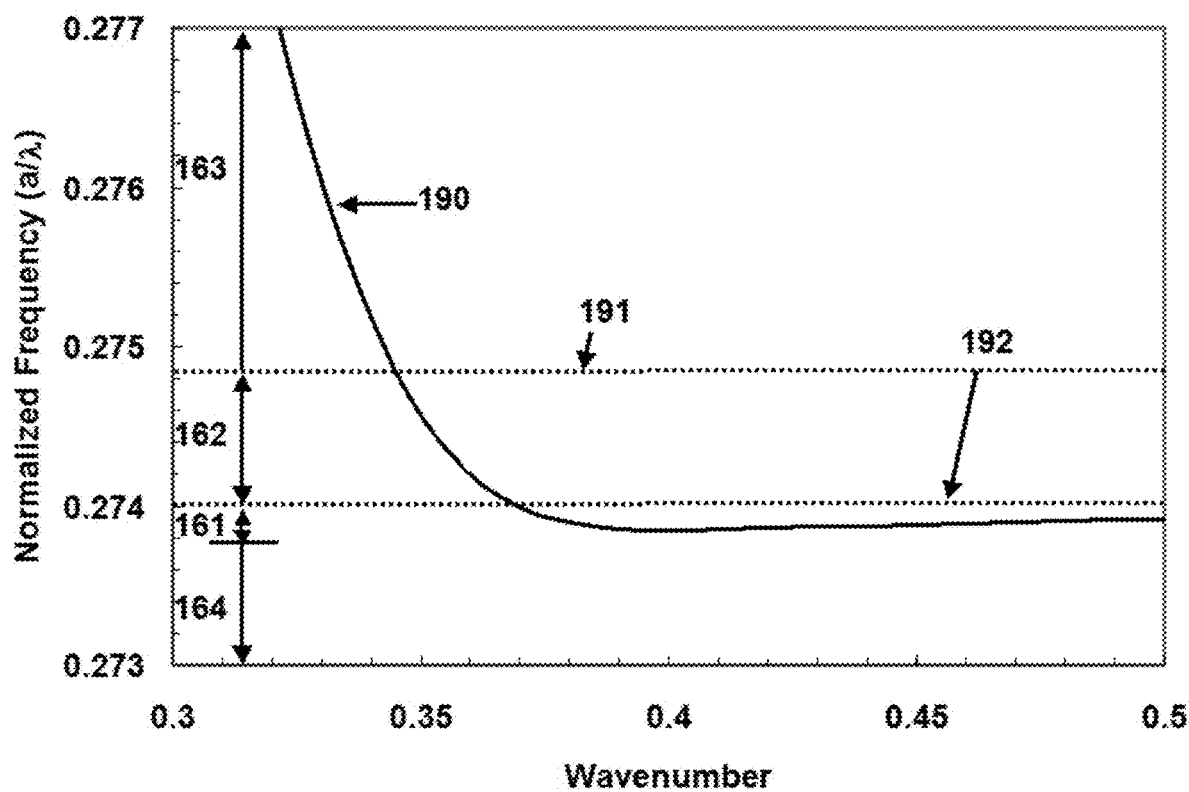
FIG. 6 illustrates a typical diagram of the dispersion relation of a photonic crystal waveguide and individual microcavities with resonant modes in the low dispersion, low group velocity region for enhanced mode coupling from waveguide to microcavity.

The bold curve 190 in FIG. 6 depicts a dispersion diagram of the photonic crystal waveguide 100. Three regions are distinctly visible in the bold curve. A region 161 where $d\omega/dk$ is almost zero, a region 163 where $d\omega/dk$ is very high and a region 162 where $d\omega/dk$ has intermediate values. $d\omega/dk$ denotes the group velocity of light propagating in the photonic crystal waveguide at the corresponding frequency. The region 164 denotes the stopgap of the photonic crystal waveguide where the transmission is zero. The coupling efficiency between a photonic crystal waveguide and a photonic crystal microcavity is inversely proportional to the group velocity, consequently, the slower the group velocities, the higher the coupling due to higher interaction time. However, region 161 is not suitable due to high dispersion and consequently high transmission loss. We identify a range of frequencies in region 162 between dotted lines 191 and 192 over which we vary the resonance of the photonic crystal microcavity to achieve high coupling efficiency with photonic crystal waveguide 100.

FIG. 7A, FIG. 7B, FIG. 8A, FIG. 8B, FIG. 8C, FIG. 8D, FIG. 8E, FIG. 8F, and FIG. 9 address photonic crystal microcavity design issues so that the entire range of frequencies between the dotted lines 191 and 192 can be efficiently used for resonant coupling, thereby increasing the number of microcavities that can be arrayed in parallel for the multiple analyte sensing diagnostic chip. FIG. 7A depicts one embodiment of a photonic crystal microcavity where a row of 4 columnar members 102 has been filled with the semiconductor dielectric material 101. We consider a photonic crystal waveguide transmission spectrum when 2 photonic crystal microcavities say 201 and 202 in FIG. 1A are coupled to the photonic crystal waveguide 100. For the microcavity 201, the columnar members 501 and 502, have each been shifted toward each other by $0.2\alpha$ and for microcavity 202 the columnar members 503 and 504 have each been shifted away from each other by $0.2\alpha$, where $\alpha$ denotes the lattice periodicity of the triangular lattice photonic crystal structure. In FIG. 7B, 2 sharp minima 511 and 512 are observed that correspond to the resonance of corresponding photonic crystal microcavities 201 and 202. This demonstrates that progressive geometry tuning of photonic crystal microcavities can result in multiple microcavities arrayed along a photonic crystal waveguide, each with a unique resonance frequency resulting in a unique transmission minimum in the photonic crystal waveguide 100 transmission spectrum. Although the magnitude of the shift is indicated as $0.2\alpha$, the magnitude of the shift can range from 0 to $0.45\alpha$.

FIG. 8A depicts another embodiment of a photonic crystal microcavity where a row of 4 columnar members 102 has been filled with the semiconductor dielectric material 101. We consider a photonic crystal waveguide transmission spectrum when 2 photonic crystal microcavities say 201 and 202 in FIG. 7A are coupled to the photonic crystal waveguide 100. The individual construction of each of the photonic crystal microcavities 201 and 202 in FIG. 7A can be described by the microcavity in FIG. 8A. As in FIG. 7A, for the microcavity 201, the columnar members 501 and 502, have each been shifted toward each other by $0.2\alpha$ and for the microcavity 202 the columnar members 503 and 504 have each been shifted away from each other by $0.2\alpha$, where $\alpha$ denotes the lattice periodicity of the triangular lattice photonic crystal structure. For the microcavity 202, as illustrated in general for a microcavity 20n, the diameters of the members 601-610 are further reduced in size to 0.9 times the diameter of columnar members 102 elsewhere. Two sharp minima 513 and 514 are observed that correspond respectively to the resonance of corresponding photonic crystal microcavities 201 and 202. The transmission minimum 514 is red-shifted corresponding to the transmission minimum 512 in FIG. 7B. The transmission minimum 513 is not shifted corresponding to the transmission minimum 511 in FIG. 7B since the geometry of microcavity 201 has not been changed from FIG. 7A. The fact is significant since this ensures that our design selection of 12 lattice periods between adjacent microcavities is optimum and does not alter either a resonance quality factor or the resonance wavelength of a designed microcavity. By reducing the diameter of the columnar members 601-610, the dielectric fraction inside the resonant mode of 202 is increased which brings the frequency of the mode down, closer to the dotted line 192 in FIG. 6. The diameter of the columnar members 601-610 can thus be changed in step to achieve a new microcavity design with a different resonant frequency. Although the magnitude of the shift for elements 501 and 502 is indicated as $0.2\alpha$, the magnitude of the shift can range from 0 to 0.45α. Although the magnitude of the diameter change of the members 601-610 is indicated as 0.9 times the diameter of columnar members 102 elsewhere, the magnitude of the shift can range from 0 to 1 times the diameter of columnar members 102 elsewhere.

Referring to FIG. 8A, columnar members 501 and 502 are not the only columnar members that may be shifted. Surrounding columnar members such as 601-610 may also be shifted towards the interior or exterior of the microcavity 20n. In one embodiment, columnar member 501 may be shifted by 0.2α in the Γ-K direction arrow shown in FIG. 8A, columnar member 502 may be shifted by 0.2α in the direction opposite to the Γ-K direction arrow shown in FIG. 8A, all columnar members 601-610 may be shifted by 0.2α, in the direction of the arrows for each element 601-610 shown in FIG. 8A. In another embodiment, columnar member 501 may be shifted by 0.2α opposite to the Γ-K direction arrow shown in FIG. 8A, columnar member 502 may be shifted by 0.2α in the direction of the Γ-K direction arrow shown in FIG. 8A, all columnar members 601-610 may be shifted by 0.2α, in the direction opposite to the arrows for each element 601-610 shown in FIG. 8A. Although the magnitude of the shift is indicated as 0.2α, the magnitude of the shift can range from 0 to 0.45α. Additionally, the columnar members 601-610 may also be shifted at any angle from 0 to 360 degrees relative to the Γ-K direction arrow in FIG. 8A. Similarly, columnar members 501 and 502 may be shifted by 0.2α, at any angle from 0 to 360 degrees relative to the Γ-K direction arrow in FIG. 8A.

FIG. 9 depicts a transmission spectrum of another embodiment of a photonic crystal microcavity where a row of 4 columnar members 102 has been filled with the semiconductor dielectric material 101. We consider a photonic crystal waveguide transmission spectrum when 2 photonic crystal microcavities say 201 and 202 in FIG. 7A are coupled to the photonic crystal waveguide 100. For the microcavity 201, the columnar members 501 and 502, have each been shifted toward each other by 0.2α and for microcavity 202 the columnar members 503 and 504 have each been shifted away from each other by 0.2α, where a denotes the lattice periodicity of the triangular lattice photonic crystal structure. For the microcavity 202, the diameters of the members 601-610 are reduced in size to 0.9 times the diameter of columnar members 102 elsewhere. For the microcavity 201, the diameters of the members 601-610 are increased in size to 1.05 times the diameter of columnar members 102 elsewhere. Two sharp minima 515 and 516 are observed that correspond respectively to the resonance of corresponding photonic crystal microcavities 201 and 202. The transmission minimum 515 is blue-shifted corresponding to the transmission minimum 511 in FIG. 7B. The transmission minimum 516 is red-shifted corresponding to the transmission minimum 514 in FIG. 8B and red-shifted further corresponding to the transmission minimum 512 in FIG. 7B. By further reducing the diameter of the columnar members 601-610 compared to FIG. 8B, the dielectric fraction inside the resonant mode of 202 is further increased which brings the frequency of the mode down further, and even closer to the dotted line 192 in FIG. 6. By increasing the diameter of the columnar members 601-610, the dielectric fraction inside the resonant mode of 201 is decreased, which raises the frequency of the resonant mode, closer to the dotted line 191 in FIG. 6. The diameter of the columnar members 601-610 can thus be changed in steps to achieve a new microcavity design with a different resonant frequency. Although the magnitude of the diameter change of the members 601-610 is indicated as 1.05 times the diameter of columnar members 102 elsewhere, the magnitude of the shift can range from 1 to 2 times the diameter of columnar members 102 elsewhere. In yet another embodiment, the columnar members 501, 502, and 601-610 in FIG. 8A can be selectively filled with a material with the same or different dielectric constant as the dielectric constant of the slab material to achieve a different resonance frequency of the photonic crystal microcavity.

In another embodiment shown in FIG. 8C, the columnar members 501, 501a, and 501b and 502, 502a, and 502b of microcavity 20n may be changed in diameter and/or shifted in position to achieve a desired resonance frequency of the photonic crystal microcavity. By making these and other similar geometry changes to the columnar members surrounding the microcavity as shown for FIG. 7A and FIG. 8A and described for FIG. 9 above, for each of the microcavities 201, 202, . . . 20n in FIG. 1A, it is possible to shift the transmission minima of the individual microcavities so that they do not overlap. The idea is to have as many first order transmission minima from the varied microcavities without interference from the second order transmission minima. One such second order transmission minima from the same microcavity as transmission minimum 512 can be seen in FIG. 7B just to the left of transmission minimum 511 at around 1580 nm.

In another embodiment shown in FIG. 8D, each microcavity 201, 202, . . . , 20(n−1), and 20n in FIG. 1A may be mirrored or duplicated on the opposite side of the photonic crystal waveguide. The microcavity 201 and the mirror microcavity 201a would have the same spacing between void columnar members adjacent to the microcavity 201 and microcavity 201a and the same diameter of void columnar members adjacent to the microcavity 201 and microcavity 201a. The composite microcavity, comprising microcavities 201 and 201a thus has a larger optical mode volume resulting in higher sensitivity to refractive index changes. In other embodiments, microcavities oriented along the crystal lattice of +60 degrees and −60 degrees as shown in FIG. 8E and FIG. 8F, respectively, may also be mirrored or duplicated directly across the photonic crystal waveguide.

In another embodiment shown in FIG. 8E and FIG. 8F, the microcavities are oriented along another orientation of the crystal lattice. Although the photonic crystal microcavities 201, 202, . . . , 20(n−1), and 20n in FIG. 1A have been shown parallel to the photonic crystal waveguide, parallel to the direction of propagation of light in the core, the array can be oriented next to the photonic crystal waveguide along any of the lattice directions at +60 degrees or −60 degrees to the photonic crystal waveguide as shown in FIG. 8E and FIG. 8F, respectively. All descriptions as shown and described for FIG. 7A, FIG. 8A, and FIG. 8C would be applied similarly with respect to the orientations shown by FIG. 8E and FIG. 8F. Although the photonic crystal microcavities in FIG. 8E and FIG. 8F have been shown drawn at 3 periods away from the photonic crystal waveguide along the respective orientations, the offset can be 1, 2, . . . 10 lattice periods. Beyond 10 lattice periods, the coupling efficiency of light from the guided light in the photonic crystal waveguide will be very small.

Figure 10I:
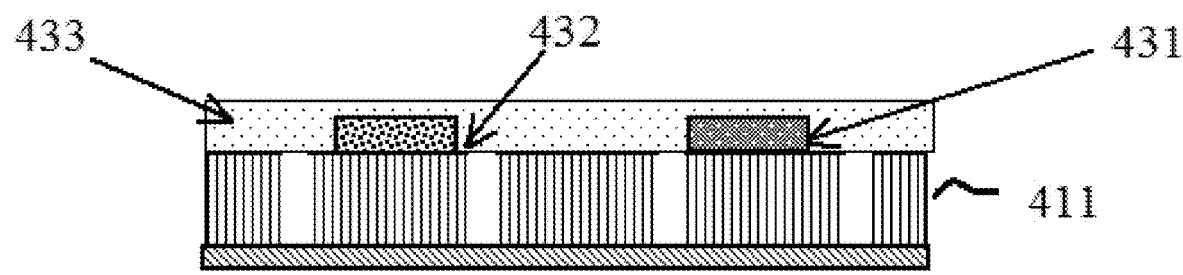

The second design concept of this invention is depicted in FIGS. 10A-10I that concerns the patterning of target binding molecules onto the patterned silicon substrate 411 using a novel microfluidic technique that preserves target binding molecule functionality in aqueous phase at all times. In one embodiment, target binding molecules are patterned on a photonic crystal patterned silicon substrate with a thin layer of silicon dioxide. The thickness of silicon dioxide is approximately 10 nm, but may range between 0 nm to about 50 nm. FIGS. 10A-10I show the steps in the fabrication process on a patterned substrate that preserves the target binding molecule functionality in aqueous phase. A film, 412 is deposited on the substrate in FIG. 10A. In one embodiment, the film 412 is parylene. A thin film of metal 413 is sputtered onto the film 412 and patterned by photolithography. (FIG. 10B). In one embodiment, the film is aluminum but it could be any metal that can be sputtered onto the film 412. Using mask 413, film 412 is etched to substrate 411 in oxygen plasma. (FIG. 10C). The film 412 is patterned so that only the region above the microcavity is opened. In one embodiment, when the device is to be used as a biosensor, the devices are functionalized by treating with 10% by volume 3-aminopropyl-triethoxy-silane (3-APTES) in toluene. It is then washed 3 times in toluene to remove unbound 3-APTES, 3 times in methanol to remove toluene and finally 3 times in de-ionized water to remove methanol. The devices are then incubated in 1% glutaraldehyde in phosphate buffered saline (PBS) for 5 minutes and washed 3 times in PBS. The above process is silanization. Simultaneously, PDMS microfluidic channels are prepared by molding technique. A master silicon wafer 421, cleaned in Piranha solution and rinsed is dried and subsequently, a photoresist 422 is spin-coated on the silicon wafer. In one embodiment, the photoresist is SU-8 but it can be any lithographically patterned polymer that can give high aspect ratio features. After patterning 422 (FIG. 10D) and baking, a mixture of another polymer precursor 423 and curing agent in the ratio of 10:1 volume together with a hydrophilic additive is poured over the 422 mold, as shown in FIG. 10E. In this embodiment the polymer 423 is polydimethylsiloxane, popularly known as PDMS. After complete curing, the 423 layer will be removed from the mold to achieve the structure as shown in FIG. 10F. The PDMS microfluidic channel is carefully aligned and mounted on the structure patterned in FIG. 10C, as shown in FIG. 10G. Solutions 433 containing different target binding molecule samples 431, 432 will be introduced into the microchannels as illustrated in FIG. 10H. The target binding molecules will be selectively deposited on exposed sites in each channel on the photonic crystal microcavity. After initial target binding molecule deposition and overnight incubation, microchannels will be thoroughly washed with PBS to purge them of any excess, unbound target binding molecule and the microchannels peeled off using tweezers. After overnight incubation and washing, the device is coated with bovine serum albumin (BSA) to prevent any non-specific binding and washed 3 times with PBS. Finally, the device as a whole is maintained in solution 433 as shown in FIG. 10I. The final photonic crystal microcavities coupled to waveguide microarray device with patterned proteins has been shown schematically in FIG. 3.

In another embodiment, the individual target binding molecules are dispensed on top of the individual photonic crystal microcavities by an ink jet printer. In this embodiment, devices are functionalized by treating with 10% by volume 3-APTES in toluene. It is then washed 3 times in toluene to remove unbound 3-APTES, 3 times in methanol to remove toluene, and finally 3 times in de-ionized water to remove methanol. The devices are then incubated in 1% glutaraldehyde in phosphate buffered saline (PBS) for 5 minutes and washed 3 times in PBS. The above process is silanization. Target biomolecules in glycerol are ink jet printed with precision on top of the photonic crystal microcavities. A unique target binding molecule 301 is printed on individual photonic crystal microcavity 201. The printed spots were left to incubate overnight. Subsequently, all target antibodies not bound to the functionalized device layer were removed by washing 3 times in PBS. After overnight incubation and washing, the device is coated with bovine serum albumin (BSA) to prevent any non-specific binding and washed 3 times with PBS. No microfluidic channels are needed in this embodiment. The final photonic crystal microcavities coupled to waveguide microarray device with patterned proteins has been shown schematically in FIG. 3.

FIG. 11 is the top view of the device in FIG. 10G and FIG. 10H. As illustrated, openings in the parylene (412) are lithographically defined so that the photonic crystal microcavity regions of 201 and 202 are exposed. The procedure applies to all microcavities 20$n$. The PDMS microchannels are depicted by the dotted elements 423. Target binding molecules 431 and 432 corresponding respectively to biomolecular specific coatings on photonic crystal microcavities 201 and 202 are flown in through the microfluidic channels in the direction of the arrows. Target binding molecules 431 and 432 correspond to 301 and 302 respectively in FIG. 3. Since the open areas in 412 have been silanized, target binding molecules 301 (431) and 302 (432) preferentially bind to the photonic crystal substrate above the photonic crystal microcavities 201 and 202 respectively. The same principle applies to all N photonic crystal microcavities arrayed along the length of the photonic crystal waveguide 100. Thus, there is no cross-contamination between 301 (431) and 302 (432).

FIG. 12A and FIG. 12B show how the detection sensitivity can be amplified as well as how more confidence is derived regarding the selectivity or specificity of the binding between an analyte and its corresponding target binding molecule on the one or more optical microcavities. The detection sensitivity of the device is determined from the magnitude of the shift in the minimum in the transmission intensity corresponding to the magnitude of the change in the resonance frequency of the resonance mode of the corresponding photonic crystal microcavity. The specificity of the detection is determined by the binding of the analyte only to specific target binding molecules. Sensitivity amplification is achieved by an enhancement of the magnitude of the shift by the secondary target binding molecule. Enhancement of detection specificity is achieved by the binding of the analyte to two polymer target binding molecules, namely, the target binding molecule attached to the photonic crystal microcavity device, and the secondary target binding molecule introduced in solution. The principle is described with respect to the resonance 515 in FIG. 9. We consider that $\lambda_{5151}$ is the minimum in the transmission wavelength corresponding to the resonance 5151 of the particular photonic crystal microcavity 201 that is coated with a target binding molecule 301 as in FIG. 3. We consider that $\lambda_{5161}$ is the minimum in the transmission wavelength corresponding to the resonance 5161 of the particular photonic crystal microcavity 202 that is coated with a target binding molecule 302 as in FIG. 3. When an analyte 3011 that binds to 301 is introduced in solution, a resonance wavelength shift is observed and the resonance minimum $\lambda_{5151}$ in the transmission spectrum shifts to the new wavelength position $\lambda_{5152}$ corresponding to the changed resonance 5152 of the photonic crystal microcavity 201 coated with target binding molecule 301. The net wavelength shift is thus $\lambda_{5152}$ minus $\lambda_{5151}$, where $\lambda_{5152}$ is greater in magnitude than $\lambda_{5151}$. No resonance wavelength shift will be observed in the resonance $\lambda_{5161}$. When a secondary target binding molecule 3012 is next introduced in solution, which also binds to the analyte 3011 that has bound to 301, a secondary resonance wavelength shift is observed and the transmission minimum $\lambda_{5152}$ shifts to a new transmission minimum $\lambda_{5153}$ corresponding to the further modified resonance frequency of the photonic crystal microcavity 201. The analyte 3011 is thus sandwiched between the two target binding molecules 301 and 3012, both of which recognize the analyte 3011. No resonance wavelength shift is observed in the transmission minimum at $\lambda_{5161}$ corresponding to the resonance 5161 that corresponds to the resonance frequency of the photonic crystal microcavity 202 that is coated with a target binding molecule 302 that does not bind to the analyte 3011. The secondary wavelength shift due to the sandwich thus amplifies the resonance wavelength shift of the corresponding photonic crystal microcavity to $\lambda_{5153}$ minus $\lambda_{5151}$, where $\lambda_{5153}$ minus $\lambda_{5151}$ is greater than $\lambda_{5152}$ minus $\lambda_{5151}$ and represents a method of amplifying the sensitivity in label-free optical microarrays. In addition, the secondary wavelength shift due to the sandwich further proves that the analyte 3011 that has bound to 301 on top of the photonic crystal microcavity 201 is indeed the analyte 3011 that must be detected and is not any other non-selective molecule or biomolecule which sticks to the molecule or biomolecule due to other physical reasons not determined by the binding kinetics between 301 and 3011. In addition to sensitivity amplification, the sandwiched detection method applied to the photonic crystal label free microcavity thus adds to detection specificity and detection selectivity. The sensor surface 201 may be regenerated by removing the analyte 3011 and the secondary target binding molecules 3012 by subjecting the sensor device to appropriate solutions such as solutions with a low pH. Consequently, in FIG. 12A and FIG. 12B, after regeneration, the resonance wavelengths $\lambda_{5152}$ and $\lambda_{5153}$ return to $\lambda_{5151}$, respectively.

Although the method in FIG. 12A and FIG. 12B above has been described with respect to photonic crystal microcavities 201 and 202, the method can be applied with respect to all photonic crystal microcavities 201, 202, . . . , 20(n-1), and 20n in FIG. 1A.

In one embodiment, the slab 101 is formed from a material of high refractive index including, but not limited to, silicon, germanium, carbon, gallium nitride, gallium arsenide, gallium phosphide, indium nitride, indium phosphide, indium arsenide, zinc oxide, zinc sulfide, silicon oxide, silicon nitride, alloys thereof, metals, and organic polymer composites. Single crystalline, polycrystalline, amorphous, and other forms of silicon may be used as appropriate. Organic materials with embedded inorganic particles, particularly metal particles, may be used to advantage. In one embodiment, the top cladding 106 and bottom cladding 105 are formed from a material whose refractive index is lower than that of the slab material. Suitable top cladding and bottom cladding materials include, but not limited to, air, silicon oxide, silicon nitride, alumina, organic polymers and alloys thereof. The substrate 107 materials include, but not limited to, silicon, gallium arsenide, indium phosphide, gallium nitride, sapphire, glass, polymer and alloys thereof. In one embodiment, the columnar members 102 are formed from a material whose refractive index is substantially lower from that of the slab 101. Suitable materials for the columnar members 102 include, but not limited to, air, silicon oxide, silicon nitride, alumina, organic polymers, or alloys thereof. In one preferred embodiment, the slab 101 is formed from silicon, the columnar members 102 are formed from air, the top cladding 106 is air, and the bottom cladding 105 is formed from silicon oxide, while the substrate 107 is silicon.

FIG. 13 depicts the change in the transmission spectrum when the procedure of the wavelength modulation method and the intensity modulation method is applied. When some biomolecules are adsorbed onto the surface of the photonic crystal microcavity, the original transmission spectrum 1301 will change to the shifted transmission spectrum 1302, and the resonance wavelength $\lambda_{1301}$ will be shifted to $\lambda_{1302}$ correspondingly. At a specific wavelength $\lambda_{1300}$ within the resonance dip, the transmitted intensity is changed from $I_{1301}$ to $I_{1302}$ due to the resonance mode shift. In wavelength modulation, the shift of the resonance wavelength is measured to obtain the information of the biomolecule interaction; in intensity modulation, the change of the transmitted intensity is measured to obtain the information of the biomolecule interaction.

In intensity modulation, the overall sensitivity S of the two-dimensional photonic crystal microcavity based biosensor depends on two figures of merit: the conversion efficiency of biomolecular binding to the shift of the resonant wavelength $\lambda_{res}$ (binding sensitivity $B_s$) and the conversion efficiency of the shift of the resonant wavelength to the change of the transmitted intensity $I_t$ (optical sensitivity $O_s$). The term $B_s$ is a function of the thickness ($d_x$) and refractive index ($n_x$) of the target binding molecules bound to the sensing surface. Note here that the biomolecule may bind directly to the sensor surface or may bind to their specific conjugate biomolecules already bound to the sensor surface. In the latter case, the affinity of the conjugating biomolecules, as measured by the affinity constant or the dissociation constant also determines the factor $B_s$. Since the biomolecular layer usually has a refractive index of 1.45, which is close to that of the silica (i.e., the material on the sensing surface of the photonic crystal microcavity), in this invention, the biomolecular layer is presumed to have essentially the same refractive index as the sensing surface, and the relation between the sensitivity and the biomolecule layer thickness $d_x$ can be expressed as:

$$S = \frac{\partial I_t}{\partial d_x} = \frac{\partial I_t}{\partial \lambda_{res}} \cdot \frac{\partial \lambda_{res}}{\partial d_x} = O_s \cdot B_s \qquad (1)$$

For the two-dimensional photonic crystal microcavity, the transmission spectrum near the resonance can be approximately described by the Lorentz equation as $$I_t = I_0 \left[ 1 - \frac{1 - T_{min}}{1 + \left(\frac{\lambda_{res} - \lambda_0}{\Delta\lambda_{res}/2}\right)^2} \right] \qquad (2)$$

where $I_0$ is the incident probe light intensity, $T_{min}$ is the minimum transmission of the resonance dip, $\lambda_0$ is the initial resonance wavelength, and $\Delta\lambda_{res}$ is the full width at half maximum (FWHM) of the resonance dip.

When $\lambda_{res} = \lambda_0 \pm 0.29\Delta\lambda$, the maximum optical sensitivity $O_{s,max}$ can be obtained:

$$O_{s,max} = \left(\frac{\partial I_t}{\partial \lambda_{res}}\right)_{max} = \pm \frac{1.3 I_0 (1 - T_{min})}{\Delta\lambda_{res}} \qquad (3)$$

The positive (negative) sign corresponds to the probe light wavelength lying on the lower (upper) side of the resonance dip.

Substituting the equation (3) into the equation (1), one obtains the maximum overall sensitivity:

$$S_{max} = \pm \frac{1.3 I_0 (1 - T_{min})}{\Delta \lambda_{res}} B_s \quad (4)$$

The above equation (4) indicates the sensitivity is proportional to the resonance mode width $\Delta \lambda_{res}$. For a narrow resonance mode, in some embodiments, the intensity modulation may be used rather than the wavelength modulation in order to take advantage of the narrow resonance dip of the two-dimensional photonic crystal microcavity and thus to achieve the highest possible sensitivity. However, the detection range in the intensity modulation is limited by the resonance width $\Delta \lambda_{res}$ (normally $2\Delta \lambda_{res}$). In some other embodiments, both the wavelength modulation and the intensity modulation are realized in an integrated system in order to possess all of the advantages and to achieve high performance.

FIG. 14A depicts the schematic of a system 1400 implementing the wavelength modulation method comprising a broadband light source 1410, a polarization adjuster such as a linear polarizer 1420, a photonic crystal sensor chip 1430, a detector 1440, and fibers 1450. In some embodiments, the broadband light source 1410 can be an Amplified Spontaneous Emission (ASE) light source, and the detector 1440 can be a spectrometer such as an Optical Spectrum Analyzer (OSA). Since the two-dimensional photonic crystal microcavity is sensitive to the light polarization, the linearly polarizer 1420 is utilized to get the right polarized light and the fibers 1450 are polarization-maintaining (PM) fibers. The fiber segment 1450 between 1430 and 1440 need not be polarization maintaining and can be single-mode or multi-mode optical fiber. When light is coupled into the photonic crystal sensor chip by end-fire coupling (that is, propagation axis of the optical fiber at the input and output lying in the horizontal plane of the slab 101 containing the photonic crystal and the input and output ridge waveguides), the input optical fiber between 1420 and 1430 and the output optical fiber between 1440 and the chip 1430 must be tapered or lensed on the side of the chip 1430. When light is coupled into the photonic crystal sensor chip using sub-wavelength grating couplers as disclosed in U.S. Pat. No. 8,636,955, the fibers 1450 may not be tapered or lensed in any segment in FIG. 14A. The photonic crystal sensor chip 1430 comprises at least one two-dimensional photonic crystal microcavity that is coupled to a photonic crystal waveguide. In some instances, as illustrated in FIG. 14B, the optical fibers 1450 may be absent at both the input and output of the chip 1430. The light from the source is then focused into the coupling elements on chip using external optics. The element 1420 would then be replaced by an element 1421 representing the external optics that would consist of any combination of lenses, mirrors, polarizers, and/or beam expanders. Similarly, at the output the light exiting the chip would be collected by external optics represented by 1422 which would consist of any combination of lenses, polarizers, mirrors and/or beam expanders. The dashed lines 14211 and 14221 represent the path of light from the optical source 1410 to the chip 1430 and the path of light from the chip 1430 to the detector 1440, respectively. The path of light within the chip 1430 is schematically represented by 14301.

FIG. 15A depicts the schematic of another system 1500 implementing the wavelength modulation method comprising a tunable laser source 1510, a rotator 1520, a two-dimensional photonic crystal sensor chip 1530, a detector 1540, and fibers 1550. The operating principle of the system 1500 is as follows: the tunable laser source 1510 is sweeping within a wavelength range. At one sweeping position, the tunable laser source works as a single-wavelength laser, providing a linearly-polarized laser light as the input light signal. Meantime, the detector 1540 such as a photodetector measures the transmitted light intensity for this specific wavelength. Therefore, a transmission spectrum can be obtained by plotting the detected light intensity versus the corresponding wavelength over the whole sweeping range. By scanning the transmission spectrum periodically, one can monitor the biomolecular binding event and thus retrieve the analyte information such as specificity, concentration, and binding affinity. The detector 1540 is connected to a computer by a cable 1560, and the tunable laser source is connected to the computer by a cable 1570. They are both controlled and operated by programs running in the computer. In some embodiments, the programs can be coded using Labview or Matlab software. Since the resonance mode of the photonic crystal microcavity can be approximately described by the Lorentz equation, the obtained transmission spectrum can be fitted by the Lorentz curve to determine the resonance wavelength. In addition, since the emitted light of the tunable laser source 1510 is linearly polarized, a rotator 1520 can be utilized to adjust the polarization direction instead of a polarizer 1420 in the system 1400, which can reduce the system cost.

The detection resolution of a system determines the minimum detectable wavelength shift thus the sensor sensitivity. For the system 1400, the detection resolution is mainly determined by the accuracy of the spectrometer such as the OSA. In some embodiments, the OSA can have an accuracy of 20 pm. For the system 1500, the detection resolution is mainly determined by the sweeping resolution of the tunable laser source. In some embodiments, the sweeping resolution can be 1 pm. However, the positioning accuracy of the tunable laser source can be 10 pm. In order to eliminate the effect of the positioning inaccuracies thus to achieve high detection resolution, a referencing method can be utilized.

FIG. 15B depicts a schematic of an enhanced system 1500' with a reference channel. In some embodiments, the photonic crystal sensor chip 1530' can have multiple photonic crystal microcavities coupled to the same or different photonic crystal waveguide on the chip 1530'. The signal channel with a sensing area for biomolecular binding is measured by one detector 1540'-1, and the reference channel comprising one photonic crystal microcavity coupled to one photonic crystal waveguide is measured by a detector 1540'-2. When the tunable laser source is sweeping, both of the detectors measure the transmitted intensities simultaneously, thus the obtained transmission spectra have the same wavelength positioning inaccuracies. One can select two resonance modes of these two transmission spectra separately, and use the wavelength difference of these two resonance modes as the signal to calculate the real resonance shift due to biomolecular binding. Therefore, the wavelength positioning inaccuracy can be eliminated. Since the reference photonic crystal microcavity is within the same sensor chip as the signal photonic crystal microcavity or microcavities, sometimes the referencing method can be thus utilized to minimize the temperature fluctuations or other system instabilities and to further improve the detection resolution.

In other embodiments similar to FIG. 14B, in each of FIG. 15A and FIG. 15B, the input optical fiber 1550 (1550') and the polarizer 1520 (1520') can be replaced by external optics similar to 1421 when not using optical fiber coupling to couple light into the chip 1430 (same as 1530 or 1530'). Similarly, the output optical fiber 1550 (1550') can be replaced by external optics similar to 1422 in FIG. 14B when not using optical fibers for coupling light out of the chip 1430 (same as 1530 or 1530').

FIG. 16A shows the schematic of a system 1600 implementing intensity modulation comprising a single-wavelength laser source 1610, a rotator 1620, a photonic crystal sensor chip 1630, a detector 1640, and fibers 1650. The detector 1640 such as a photodetector is connected to a computer and controlled by a program such as a Labview or Matlab program. The wavelength of the laser source 1610 is within the resonance dip of the photonic crystal microcavity, and the change of the transmitted light intensity is measured by the detector 1640 in real time. Since the transmission spectrum near the resonance can be approximately described by the Lorentz equation (equation (2)), the real-time intensity change can be converted to real-time wavelength shift, which can be used to monitor the biomolecule binding event.

The equation (4) implies that the intensity fluctuations of the incident probe light directly affect the response of the photonic crystal sensor. In order to suppress the effect of the laser instabilities, temperature fluctuations, etc., FIG. 16B further implements a referencing method. Similar to the system 1500' depicted in FIG. 15B, one reference channel using one photonic crystal microcavity on the photonic crystal sensor chip 1630' is adopted. FIG. 16B shows the schematic illustration of a system 1600' comprising a single-wavelength laser source 1610', a rotator 1620', a photonic crystal sensor chip 1630', detectors 1640'-1 and 1640'-2, and fibers 1650'. The transmitted intensities of the signal channel and the reference channel are recorded by the detectors 1640'-1 and 1640'-2, respectively, and the ratio between them is used to monitor the real-time biomolecular binding event. FIG. 16C shows the sensorgrams monitored by the transmitted signal intensity and by the normalized intensity ratio, where region I is the baseline of the photonic crystal sensor and region II reflects real-time ambient medium changing or biomolecules adsorbed onto the sensor surface of the photonic crystal sensor. By normalization, a much better noise floor, thus higher detection resolution can be achieved in the system 1600'.

In other embodiments similar to FIG. 14B, in each of FIG. 16A and FIG. 16B, the input optical fiber 1650 (1650') and the polarizer 1620 (1620') can be replaced by external optics similar to 1421 when not using optical fiber coupling to couple light into the chip 1430 (same as 1630 or 1630'). Similarly, the output optical fiber 1650 (1650') can be replaced by external optics similar to 1422 in FIG. 14B when not using optical fibers for coupling light out of the chip 1430 (same as 1630 or 1630').

In some embodiments, the system 1600 implementing the intensity modulation can be integrated with the system 1500 implementing the wavelength modulation using a tunable laser source as the input light source, as the tunable laser source itself is a single-wavelength laser source when positioned at a specific wavelength. They can share the same system components except that they can be controlled by different programs in the computer. The wavelength modulation can be used to get the transmission spectrum of the photonic crystal sensor and to measure large resonance wavelength shifts; while the intensity modulation can be used to measure small wavelength shifts in real time with high detection resolution. Therefore, the integrated system can possess their advantages and achieve higher sensing performance.

The unique advantage of the two-dimensional photonic crystal microcavity is that it can realize miniaturized and highly-multiplexing biosensor systems. FIG. 17A shows the three-dimensional schematic of a system or apparatus 1700 integrating the two dimensional photonic crystal sensor for highly-multiplexing detections. The system 1700 comprises a light source 1710, an optical fiber coupler 1720, a photonic crystal sensor chip 1730 put on a temperature controller 1770 and an adjustable stage 1780, a detector 1740, fiber coupling arrays 1760-1 and 1760-2, an optical switch 1790, and fibers 1750. A polarizer, used to select a light wave of particular polarization, may be integrated between the light source 1710 and the optical fiber coupler 1720. The photonic crystal sensor chip 1730 can have structures similar to FIGS. 1 to 11, 15 to 23B, 25 to 27, and 30 to 32 in U.S. Pat. No. 8,636,955. All of the components are integrated on a flat substrate 1701. FIG. 17B shows the two-dimensional schematic of the system 1700 in FIG. 17A. FIG. 17C further implements a system 1700" with a reference channel to improve the detection resolution of the system. This referencing method is adopted similar to the one adopted in the system 1500' or 1600'. The system 1700" comprises a light source 1710", an optical fiber coupler 1720", a photonic crystal sensor chip 1730" mounted on a temperature controller 1770" and a movable stage 1780", detectors 1740"-1 and 1740"-2, fiber coupling arrays 1760"-1 and 1760"-2, an optical switch 1790", and fibers 1750". All of the components are integrated on a flat substrate 1701".

The number of the multiplexing channels S that can be configured by the optical fiber coupler 1720 with X outputs using a 1 by X optical fiber splitter, each output from the X outputs being input to one input fiber in a 1 times X optical fiber array for a total of X optical fiber inputs prior to the photonic crystal sensor chip 1730. If the total number of multiplexed photonic crystal microcavity sensors coupled to photonic crystal waveguides on the photonic crystal sensor chip is Z (where the magnitude of Z is described in detail in U.S. Pat. No. 8,636,955), the total available multiplexed sensors measured by the system 1700 can be calculated to be $S = X \times Z$. An optical switch that comprises the output optical fiber coupler with the configuration of R inputs to 1 output can be utilized to control the output of the individual sensor channels, where the number of inputs r=1, 2, . . . , R is determined by the number of outputs R from the photonic crystal sensor chip 1730. The transmitted intensity or spectrum of each channel can be obtained by switching the optical switch to the corresponding channel. In some embodiments, the switching time can be less than 20 ms. Therefore, it can achieve high throughput detection with only one tunable light source and one photodetector. In some embodiments, the input optical fiber coupler can comprise another optical switch with 1 input to X outputs to replace the optical fiber splitter in order to realize the same multiplexing channels. A 1 by X input optical switch provides several advantages over a 1 by X optical splitter: first, it can get a probe light with a higher intensity for each sensing channel, as the input light is guided to only 1 channel once a time using the optical switch, instead of being distributed to X channels using the optical fiber splitter; second, it can eliminate the crosstalk between adjacent channels in the optical fiber splitter, as it can make the light go through one channel and close all the other channels.

In some embodiments for wavelength modulation, the light source 1710 can be a broadband light source and the detector 1740 can be a spectrometer, similar as described in the system 1400. In another embodiment for wavelength modulation, the light source 1710 can be a tunable laser source and the detector 1740 can be a photodetector, similar as described in the system 1500. In yet another embodiment for intensity modulation, the light source 1710 can be a single-wavelength laser source and the detector 1740 can be a photodetector, similar as described as in the system 1600. As previously disclosed, the tunable laser source can be as a single-wavelength laser source at a specific position, thus one embodiment can integrate both wavelength modulation and intensity modulation for multiplexing detection.

FIGS. 18A-18C show the experimental results utilizing the system depicted in FIG. 15A. FIG. 18A shows the whole transmission spectrum 1800 with water as the ambient medium on top of the photonic crystal microcavity. FIG. 18B shows a section of the transmission spectrum 1800 in solid line and the resonance wavelength indicated by 1810. When the ambient medium changes from water to glycerol, due to the change in refractive index of the ambient, the transmission spectrum changes to 1830 as shown in the dotted line of FIG. 18B and the resonance wavelength 1810 changes to the resonance wavelength 1820 with a large resonance wavelength shift, as depicted in FIG. 18B. A sensorgram, shown in FIG. 18C, monitoring the shift of the resonance wavelength, as a function of time, may be obtained by recording the transmission spectrums 1800 and 1830 and thus retrieving the resonance wavelength in real time with the ambient medium changing from water to glycerol, as shown in FIG. 18C. FIG. 18C indicates that the resonance wavelength is at approximately 1554 nm corresponding to the resonance wavelength position 1810 in water. When glycerol is added at time t=0, the resonance wavelength changes and stabilizes at approximately 1562 nm, corresponding to the resonance wavelength 1820 position in glycerol. The sensorgram therefore monitors the change in resonance wavelength as a function of time caused by the corresponding change in refractive index of the ambient.

While the sensorgram in FIG. 18C has been described with respect to water and glycerol, changes in refractive index of the ambient caused by the binding of analytes to the biomolecules will also cause a change in the resonance wavelength as a function of time. Assuming that 1810 represents the resonance wavelength position, with the device in ambient, prior to the addition of sample containing the analyte, when an analyte binds to its specific conjugate target biomolecule, the resonance wavelength gradually increases until an equilibrium is achieved between the analyte and the biomolecule receptor on the photonic crystal microcavity, upon which the resonance wavelength stabilizes to a new position 1820. The equilibrium condition is determined by the equation: [A][B]↔$K_D$ [AB], where [A] denotes the concentration of the target binding biomolecule that is immobilized to the photonic crystal microcavities (for example 301 on the photonic crystal microcavity 201), [B] denotes the concentration of analyte which are the specific conjugates of the target binding biomolecule 301 for example, and [AB] denotes the concentration of conjugated target binding biomolecules of 301 that are conjugated to their specific conjugate analyte in the sample. $K_D$ denotes the dissociation constant. The rate of change of the resonance wavelength versus time is a function of the affinity between the analyte and its specific conjugate biomolecule. The affinity constant or the dissociation constant of the binding may be measured from the rate of change of resonance wavelength versus time.

Figure 18D:
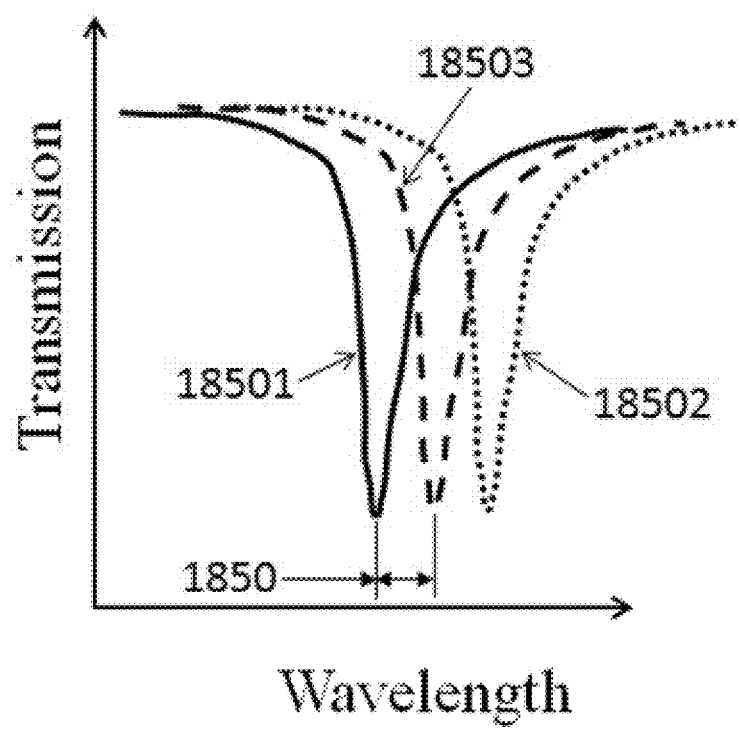
Figure 18E:
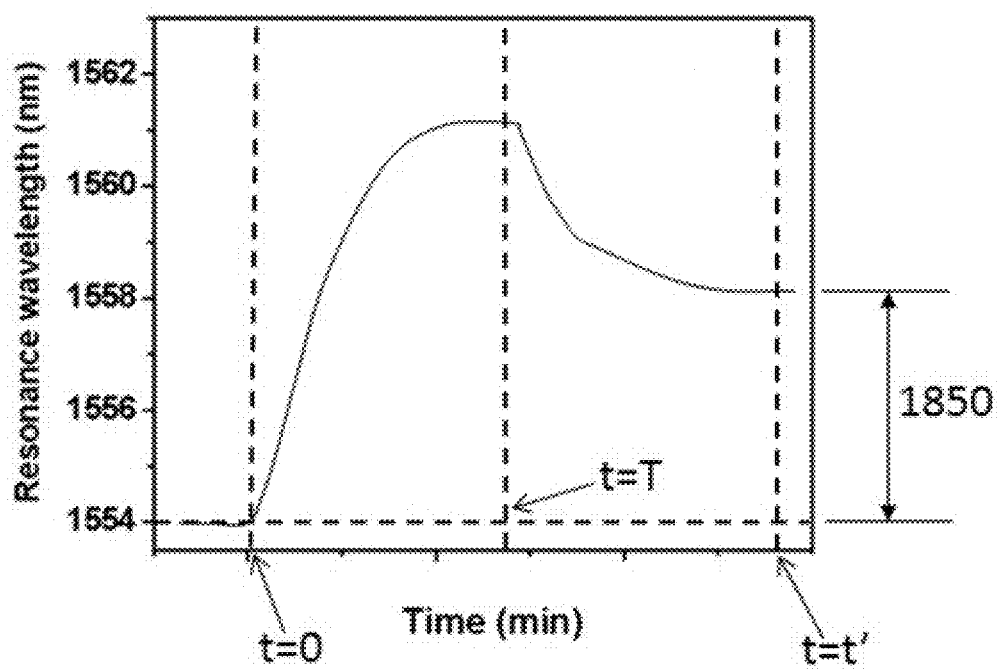

FIG. 18D describes a typical biosensing experiment. At time t=0, considering any one of the cavities, for example 201 in FIG. 1A, the resonance wavelength is at 1554 nm and assume that it is represented by the transmission spectrum 18501 in FIG. 18D. Upon introduction of the sample containing the analyte, assuming the analyte is a specific conjugate of the target binding biomolecule that coats the optical microcavity 201, the resonance wavelength keeps increasing as a function of time as shown by the sensorgram in FIG. 18E. At time t=T, an equilibrium is reached and the resonance wavelength is at 1561 nm and no longer changes. This situation is represented by the transmission spectrum 18502 in FIG. 18D. Due to adsorption phenomena, analyte molecules may just accumulate in the vicinity of the photonic crystal microcavity in addition to the analyte molecules that manage to occupy all the target binding sites on the biomolecule coating 301. The analyte molecules which just accumulate without finding a target binding site on 301, since the equilibrium condition is already satisfied, are referred to as unbound biomolecules or unbound analyte. Next, a buffer solution such as phosphate buffered saline (PBS) is flowed over the chip to remove unbound analyte in the vicinity of the photonic crystal microcavity 201. The sensorgram in FIG. 18E shows a gradual decrease in resonance wavelength until all the unbound analyte is washed away and another equilibrium represented by a constant wavelength at 1558 nm versus time is reached at time t=t'. This situation is represented by the transmission spectrum 18503 in FIG. 18D. The final resonance wavelength shift is given by the difference in resonance wavelengths at times t=t' and t=0 and represented by the wavelength shift 1850, which is also indicated in FIG. 18D. Instead of showing absolute wavelengths as in FIG. 18E, the sensorgrams may show the wavelength shift versus time as in FIG. 18F. Similar sensorgrams are obtained for each increasing concentration of the analyte as shown in FIG. 18G and wavelength shifts are recorded for each sensorgram. Sensorgrams for five representative concentrations, indicated by roman numerals I, II, III, IV, and V are shown in FIG. 18G, along with their corresponding wavelength shifts, 1847, 1848, 1849, 1850, and $\Delta\lambda_{max}$, respectively. Assuming that V represents the sensorgram for the highest concentration tested, then the value of the wavelength shift for this sensorgram V is represented by $\Delta\lambda_{max}$. The wavelength shifts from each sensorgram are plotted as a function of the corresponding analyte concentration as in FIG. 18H, represented by the black circular dot data points. The data points for resonance wavelength shifts for the five representative analyte concentrations (I, II, III, IV, and V) from FIG. 18G, are labeled in FIG. 18H. The other unlabeled data points of FIG. 18H represent other intermediate analyte concentrations. The plot of FIG. 18H is curve fitted according to the equation $\Delta\lambda/\Delta\lambda_{max}=K_A c/(1+K_A C)$, where c denotes the concentration of the analyte, $K_A$ denotes the affinity constant, $\Delta\lambda$ denotes the net resonance wavelength shift observed for each concentration, $\Delta\lambda_{max}$ denotes the maximum wavelength shift as shown by the plot denoted by V in FIG. 18G. The affinity constant $K_A$ is thus determined. The dissociation constant $K_D$ is the reciprocal of the affinity constant $K_A$. Similar measurements are done for each of the photonic crystal microcavities in the system for the analyte of interest and all $K_A$ values obtained simultaneously at the same instant of time. The dissociation constant $K_D$ is calculated for all photonic crystal microcavities, as the reciprocal of the corresponding affinity constant $K_A$.

Figure 18F:
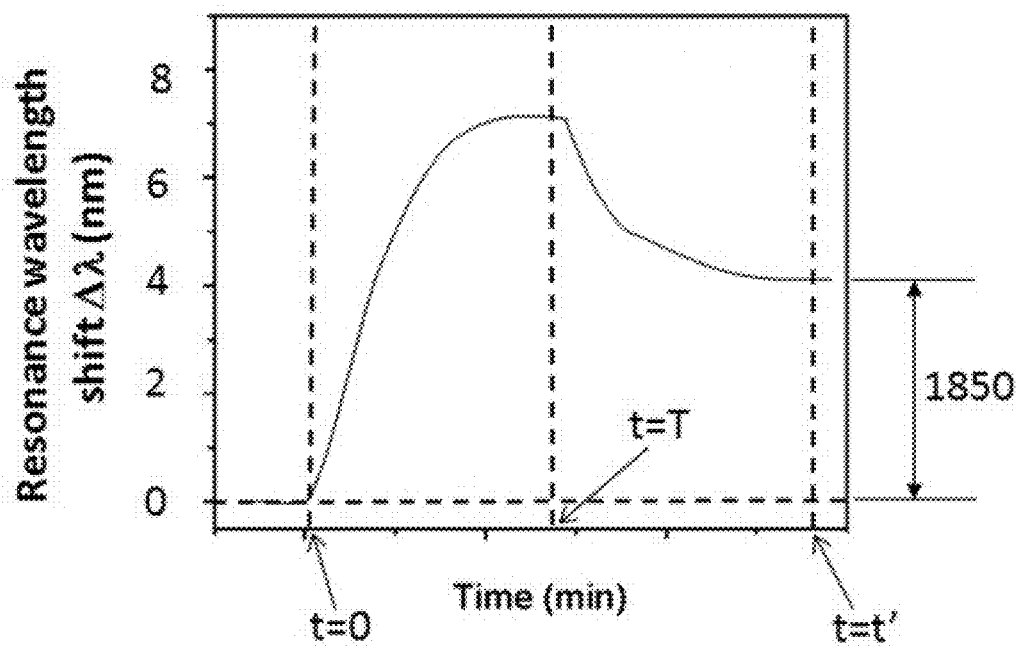
Figure 18G:
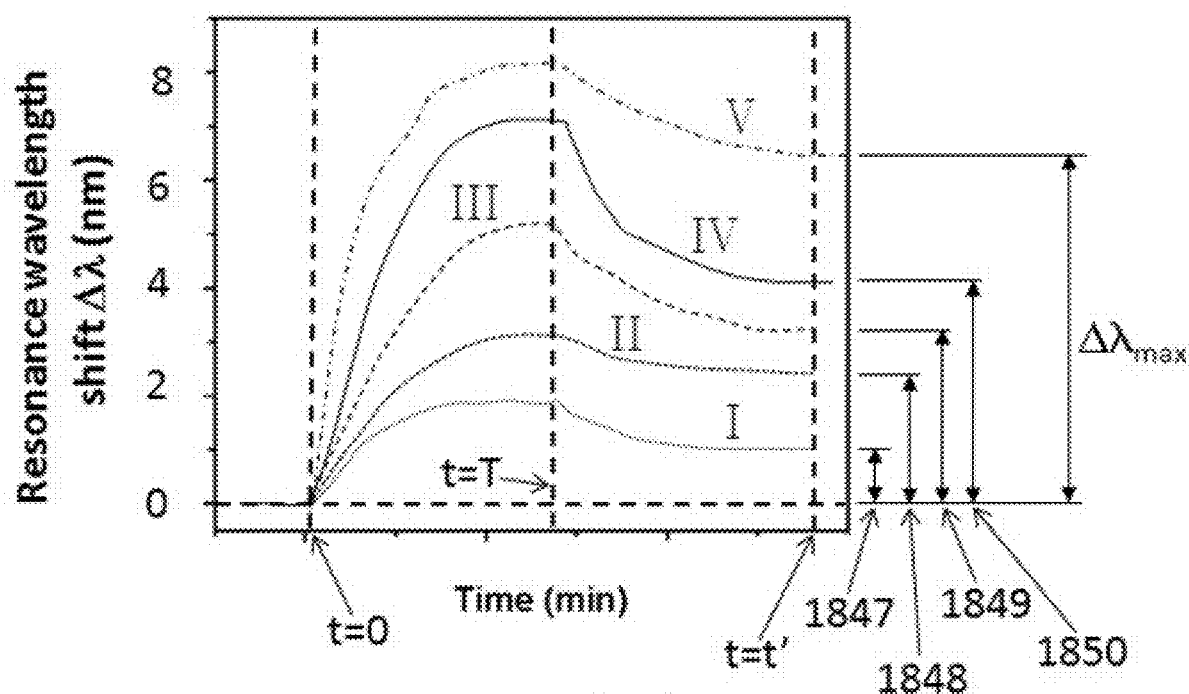
Figure 18H:
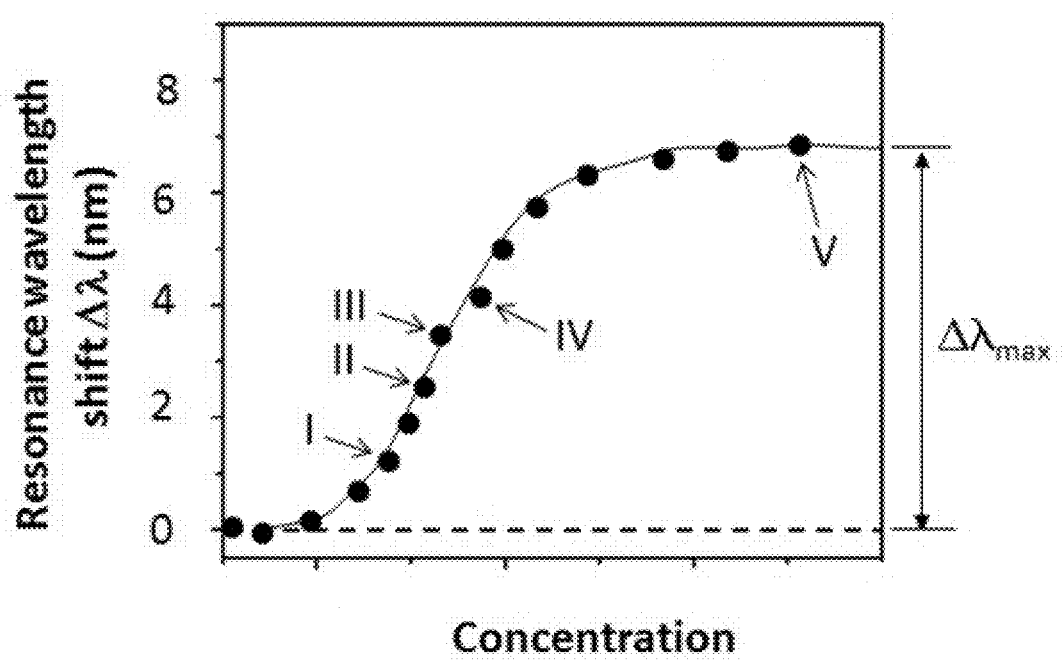
Figure 18I:
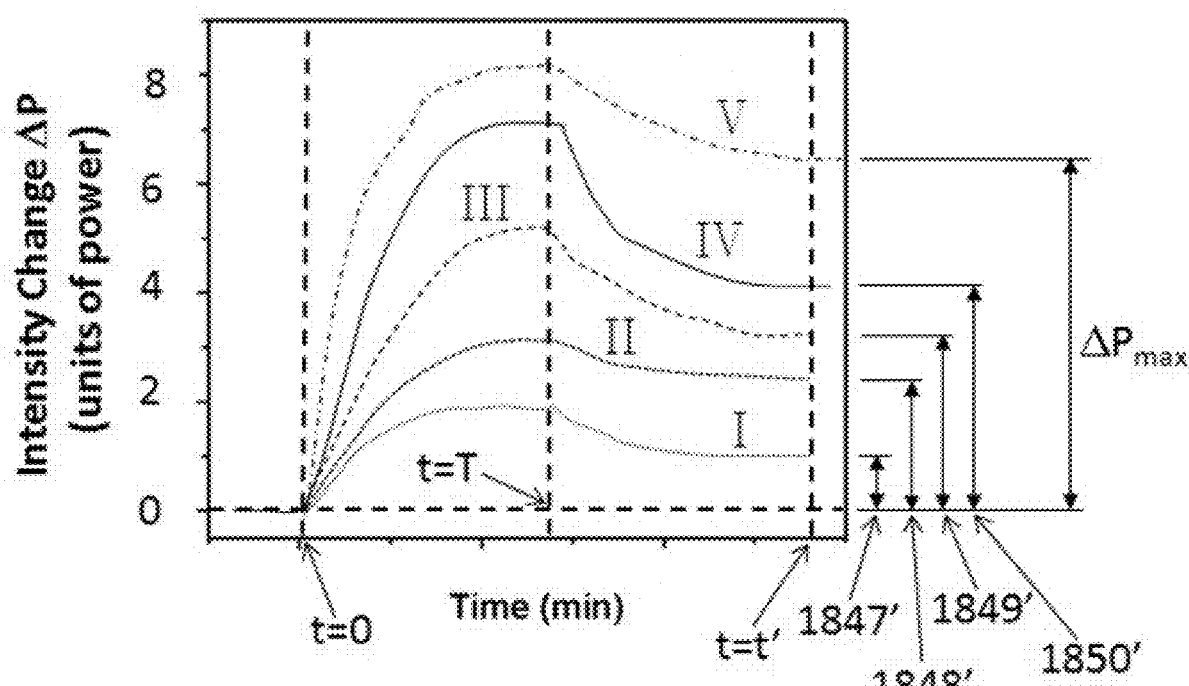
Figure 18J:
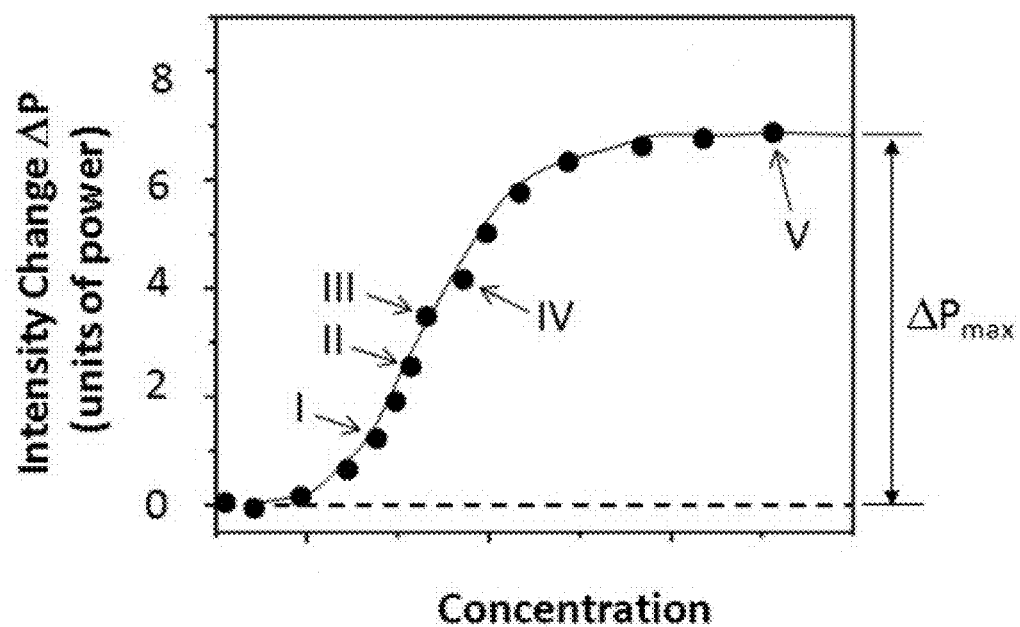

A similar analysis to determine $K_A$ can be done when measuring the intensity changes ΔP, as shown in FIG. 18I and FIG. 18J, net intensity change for each concentration denoted by 1847', 1848', 1849', and 1850', maximum intensity change $\Delta P_{max}$ and sensorgrams obtained similar to FIG.

18E, FIG. 18F, FIG. 18G, and FIG. 18H, except this time measuring intensity changes versus time as described in FIG. 16C. The corresponding equation for obtaining $K_A$ would then read $\Delta P/\Delta P_{max}=K_A c/(1+K_A C)$. Similar measurements are done for each of the photonic crystal microcavities in the system for the analyte of interest and all $K_A$ values obtained simultaneously at the same instant of time. The dissociation constant $K_D$ is calculated for all photonic crystal microcavities, as the reciprocal of the corresponding affinity constant $K_A$.

For known analyte and biomolecules, such sensorgrams may be plotted via measurements for several known concentrations. Hence, if both the biomolecule and the analyte are known and the concentration of the analyte is unknown, the magnitude of the change in resonance wavelength position from 1810 to 1820, as obtained from the sensorgram, is a measure of the concentration of the analyte. Any intermediate concentrations can be interpolated between data corresponding to known changes. If the analyte does not bind to the biomolecule, there will be no change in the resonance wavelength position 1810.

While the sensorgram in FIG. 18C has been described with respect to a single photonic crystal microcavity, simultaneous sensorgrams may be obtained for each and every photonic crystal microcavity of the sensor chip.

Although the word "biomolecule" is used in the preceding discussions, one skilled in the art will understand that it refers to a general form of biomolecule that includes, but not limited to, proteins, deoxyribonucleic acid (DNA), ribonucleic acid (RNA), genes, antigens, antibodies, small molecules, nucleic acids, bacteria, viruses, and any arrayed combination thereof for the specific diagnosis of diseases. "Molecule" can denote any polymer or hydrogel that responds to changes in the ambient medium of the device. Any combination of "molecules" and "biomolecules" can be arrayed on the device to get precise knowledge of process conditions, system conditions, analyte identification and/or binding events for disease identification.

Although the word "light" or "lightwave" is used to denote signals in the preceding discussions, one skilled in the art will understand that it refers to a general form of electromagnetic radiation that includes, and is not limited to, visible light, infrared light, ultra-violet light, radios waves, and microwaves.

In summary, the present invention provides an ultra-compact microarray device architecture using two-dimensional photonic crystal microcavities coupled to a single photonic crystal waveguide, together with a new microfluidic technique that preserves the biomolecule functionality in aqueous phase. The invention enables massively parallel, label-free, on-chip multi-analyte sensing for biochemical sensing and a diagnostic assay for any disease, which displays target-probe biomolecule conjugation. The biomolecule of interest can be DNA, RNA, proteins, nucleic acids, and small molecules. It incorporates a new microfluidic technique with photonic crystal devices, that allows patterning of biomolecules in the aqueous phase. Owing to the small dimensions of the devices presented herein, one can monolithically integrate the photonic crystal microarrays on silicon VLSI chips. The CMOS compatible photonic crystal microarray devices have simpler design requirements than the microelectronics industry. Furthermore, easy regeneration capability and high measurement throughput ensures that our miniature compact devices will deliver improved results with significantly lower cost to the customer. The device is of extreme significance in basic biological sciences and human health diagnostics, as well as in the food and beverage industry and in bio-warfare defense.

In addition, the present invention provides methods and systems to monitor the resonance mode shift of the photonic crystal sensor, including wavelength modulation, intensity modulation, or both. One embodiment utilizes a tunable light source and a photodetector to integrate both wavelength modulation and intensity modulation to achieve large detection range and high detection resolution, thus high sensing performance. In addition, this embodiment enables the monitoring of the biomolecular binding event in real time and then the retrieval of the biomolecule information such as specificity, concentration, and binding affinity. Moreover, a referencing method is provided to eliminate the sweeping inaccuracy and minimize the system fluctuations and to further improve the system performance. The present invention also provides effective methods to realize integrated and miniaturized sensor systems for high throughput biomolecular detection.

While the invention has been described in connection with a number of preferred embodiments, it is not intended to limit the scope of the invention to the particular form set forth, but on the contrary, it is intended to cover such alternatives, modifications, and equivalents as may be included within the design concept of the invention as defined by the appended claims.

The invention claimed is:

1. An apparatus for highly-sensitive, label-free, multiple analyte sensing, biosensing, and diagnostic assay comprising:
   an electromagnetic radiation source comprising an output;
   input coupling optics comprising an input and an output, wherein the output of the electromagnetic radiation is coupled to the input of the input coupling optics;
   a two-dimensional photonic crystal sensor chip comprising:
   (i) a substrate;
   (ii) a slab disposed on the substrate;
   (iii) a plurality of void columnar members etched through the slab, wherein the plurality of void columnar members form a periodic lattice with a lattice constant $\alpha$;
   (iv) a core in the slab having an input side and an output side;
   (v) one or more photonic crystal waveguides each with an array of photonic crystal microcavities, wherein the one or more photonic crystal waveguides are formed within the core by a row of void columnar members from the input side to the output side, wherein the row of void columnar members is filled with the material of the slab, and wherein the array of photonic crystal microcavities comprise one or more optical microcavities formed by a group of columnar members, wherein the group of columnar members is filled with the material of the slab and wherein the one or more optical microcavities are at an angle of 0 degrees, +60 degrees, or −60 degrees relative to the core and are separated from each other and the photonic crystal waveguide by one or more lattice constants;
   (vi) one or more input impedance tapers in the one or more photonic crystal waveguides at the input side;
   (vii) one or more input ridge waveguides in the core coupled to the one or more input impedance tapers in the one or more photonic crystal waveguides, along the slab, wherein the one or more input impedance tapers are configured to couple the electromagnetic radiation between the one or more input ridge waveguides and the core;

(viii) one or more output impedance tapers in the one or more photonic crystal waveguides at the output side; and (ix) one or more output ridge waveguides in the core coupled to the one or more output impedance taper in the one or more photonic crystal waveguide, along the slab, wherein the one or more output impedance tapers are configured to couple the electromagnetic radiation between the core and the one or more output ridge waveguides;

(x) wherein the output of the input coupling optics is coupled to the one or more input ridge waveguides;

(xi) wherein each of the one or more photonic crystal waveguides support one or more guided modes of the electromagnetic radiation;

(xii) wherein each of the one or more optical microcavities are uniquely tuned to support one or more resonance modes;

(xiii) wherein the one or more optical microcavities are tuned by changing at least one of: the spacing of the void columnar members adjacent to the one or more optical microcavities and the diameter of the void columnar members adjacent to the one or more optical microcavities;

(xiv) wherein each of the one or more optical microcavities along each of the one or more photonic crystal waveguides has a unique resonance frequency that does not overlap with the resonance frequency of any other optical microcavity along each of the one or more photonic crystal waveguides;

(xv) wherein the array of photonic crystal microcavities with one or more target binding molecules coated on the array of photonic crystal microcavities uniquely support one or more resonance modes comprising one or more unique resonant frequencies trapped by the array of photonic crystal microcavities resulting in unique minima in a transmission spectrum of the one or more guided modes of the broadband source at the corresponding resonant frequencies of the one or more optical microcavities; and (xvi) wherein one or more label-free analytes selectively bind to the one or more target binding molecules resulting in shifting the one or more resonant frequencies of the one or more optical microcavities and hence the unique minima in the transmission spectrum of the one or more guided modes of the electromagnetic radiation;

output coupling optics comprising an input and an output, wherein the one or more output ridge waveguides are coupled to the input of the output coupling optics; and a detector comprising an input, wherein the output of the output coupling optics is coupled to the input of the detector.

2. The apparatus of claim 1, wherein the input coupling optics comprises:
a first fiber comprising an input and an output, wherein the input of the input coupling optics comprises the input of the first fiber;
a polarization adjuster comprising an input and an output, wherein the output of the first fiber is coupled to the input of the polarization adjuster; and
a second fiber comprising an input and an output, wherein the output of the polarization adjuster is coupled to the input of the second fiber and wherein the output of the input coupling optics comprises the output of the second fiber.

3. The apparatus of claim 1, wherein the input coupling optics comprises:
a first fiber comprising an input and an output, wherein the input of the input coupling optics comprises the input of the first fiber;
a polarization adjuster comprising an input and an output, wherein the output of the first fiber is coupled to the input of the polarization adjuster;
a second fiber comprising an input and an output, wherein the output of the polarization adjuster is coupled to the input of the second fiber;
an input optical fiber coupler comprising an input and an output, wherein the output of the second fiber is coupled to the input of the input optical fiber coupler; and
an input fiber coupling array comprising an input and an output, wherein the output of the input optical fiber coupler is coupled to the input of the input fiber coupling array and wherein the output of the input coupling optics comprises the output of the input fiber coupling array.

4. The apparatus of claim 1, wherein the output coupling optics comprises a third fiber comprising an input and an output, wherein the input of the output coupling optics comprises the input of the third fiber and wherein the output of the output coupling optics comprises the output of the third fiber.

5. The apparatus of claim 1, wherein the output coupling optics comprises:
an output fiber coupling array comprising an input and an output, wherein the input of the output coupling optics comprises the input of the output fiber coupling array;
an output optical fiber coupler comprising an input and an output, wherein the output of the output fiber coupling array is coupled to the input of the output optical fiber coupler; and
a third fiber comprising an input and an output, wherein the output of the output fiber coupling array is coupled to the input of the third fiber and wherein the output of the output coupling optics comprises the output of the third fiber.

6. The apparatus of claim 1, wherein at least one of the one or more photonic crystal waveguides and at least one of the one or more photonic crystal microcavities coupled to the at least one of the one or more photonic crystal waveguides is configured as a reference channel.

7. The apparatus of claim 1, wherein the electromagnetic radiation source is at least one of: a single-wavelength electromagnetic radiation source, a tunable wavelength electromagnetic radiation source, and a broadband-wavelength electromagnetic radiation source.

8. The apparatus of claim 1, wherein the detector is at least one of: a photodetector, a spectrometer, and an optical spectrum analyzer.

9. The apparatus of claim 2, wherein the polarization adjuster comprises a linear polarizer or a rotator.

10. The apparatus of claim 3, wherein the polarization adjuster comprises a linear polarizer or a rotator.

11. The apparatus of claim 2, wherein the first fiber comprises polarization-maintaining fiber and wherein the second fiber comprises polarization-maintaining fiber.

12. The apparatus of claim 4, wherein the third fiber comprises single mode optical fiber or multimode optical fiber.

13. The apparatus of claim 3, wherein the first fiber comprises polarization-maintaining fiber and wherein the second fiber comprises polarization-maintaining fiber.

14. The apparatus of claim 5, wherein the third fiber comprises single mode optical fiber or multimode optical fiber.

15. The apparatus of claim 1, further comprising a computer coupled to the electromagnetic radiation source and to the detector.

16. The apparatus of claim 1, further comprising a temperature controller coupled to the two-dimensional photonic crystal sensor chip and an adjustable stage coupled to the temperature controller.

17. The apparatus of claim 3, wherein the input optical fiber coupler comprises an optical splitter or an optical switch.

18. The apparatus of claim 5, wherein the output optical fiber coupler comprises an optical combiner or an optical switch.

* * * * *